(12) United States Patent
Ozawa et al.

(10) Patent No.: US 8,360,655 B2
(45) Date of Patent: Jan. 29, 2013

(54) BEARING DEVICE FOR WHEEL

(75) Inventors: Masahiro Ozawa, Iwata (JP); Tohru Nakagawa, Iwata (JP); Yuichi Asano, Iwata (JP)

(73) Assignee: NTN Corporation, Osaka (JP)

( * ) Notice: Subject to any disclaimer, the term of this patent is extended or adjusted under 35 U.S.C. 154(b) by 402 days.

(21) Appl. No.: 12/682,622

(22) PCT Filed: Oct. 8, 2008

(86) PCT No.: PCT/JP2008/068281
§ 371 (c)(1),
(2), (4) Date: Apr. 12, 2010

(87) PCT Pub. No.: WO2009/051047
PCT Pub. Date: Apr. 23, 2009

(65) Prior Publication Data
US 2010/0220946 A1    Sep. 2, 2010

(30) Foreign Application Priority Data

Oct. 15, 2007  (JP) ................................ 2007-267553
Oct. 17, 2007  (JP) ................................ 2007-269728
Oct. 17, 2007  (JP) ................................ 2007-269730

(51) Int. Cl.
*F16C 13/00* (2006.01)
(52) U.S. Cl. ........................................ 384/544; 384/589
(58) Field of Classification Search .... 403/359.1–359.6; 464/178, 182, 906; 384/544, 589
See application file for complete search history.

(56) References Cited

U.S. PATENT DOCUMENTS 6,497,515 B1 * 12/2002 Sahashi et al. ................ 384/544
2004/0234182 A1   11/2004 Tajima et al.

FOREIGN PATENT DOCUMENTS

| EP | 1 396 354 | 3/2004 |
| JP | 08-226426 | 9/1996 |
| JP | 2002-002211 | 1/2002 |
| JP | 2002-219903 | 8/2002 |
| JP | 2003-65347 | 3/2003 |
| JP | 2004-340311 | 12/2004 |

(Continued)

OTHER PUBLICATIONS

International Search Report issued Jan. 6, 2009 in International (PCT) Application No. PCT/JP2008/068281.

(Continued)

*Primary Examiner* — Phillip A Johnson
(74) *Attorney, Agent, or Firm* — Wenderoth, Lind & Ponack, L.L.P.

(57) ABSTRACT

A bearing device for a wheel is capable of suppressing a backlash in a circumferential direction, is excellent in coupling operability of a hub wheel and an outer joint member of a constant velocity universal joint, and is excellent for maintenance by allowing separation of the hub wheel and the outer joint member of the constant velocity universal joint. In the bearing device for a wheel, a hub wheel, and a shaft section of the outer joint member of a constant velocity universal joint are separably coupled with each other through a recess-projection fitting structure, the shaft section being inserted in a fitting manner into a hole portion of the hub wheel. Projecting portions extending in an axial direction are provided on one of an outer surface of the shaft section of the outer joint member and an inner surface of the hole portion of the hub wheel.

43 Claims, 15 Drawing Sheets

FOREIGN PATENT DOCUMENTS

| | | |
|---|---|---|
| JP | 2005-041311 | 2/2005 |
| JP | 2005-193757 | 7/2005 |
| JP | 2005-233402 | 9/2005 |
| JP | 2007-46703 | 2/2007 |
| JP | 2007-055322 | 3/2007 |
| JP | 2007-055503 | 3/2007 |
| JP | 2007-085372 | 4/2007 |
| JP | 2007-261577 | 10/2007 |
| WO | 02/102608 | 12/2002 |
| WO | 2007/018001 | 2/2007 |

OTHER PUBLICATIONS

International Preliminary Report on Patentability and Written Opinion of the International Searching Authority mailed May 20, 2010 in International (PCT) Application No. PCT/JP2008/068281.

* cited by examiner

US 8,360,655 B2

BEARING DEVICE FOR WHEEL

TECHNICAL FIELD

The present invention relates to a bearing device for a wheel for supporting wheels to freely rotate relative to a vehicle body in a vehicle such as an automobile.

BACKGROUND ART

The bearing device for a wheel has evolved from a structure called first generation in which double-row roller bearings are independently used to second generation in which a vehicle body attachment flange is integrally provided in an outer member. Further, third generation in which one inner rolling surface of the double-row roller bearings is integrally formed with an outer circumference of a hub wheel integrally having a wheel attachment flange has been developed. Further, fourth generation in which a constant velocity universal joint is integrated with the hub wheel and another inner rolling surface of the double-row roller bearings is integrally formed with an outer circumference of an outer joint member constituting the constant velocity universal joint has been developed.

For example, the bearing device for a wheel called third generation is described in Patent Literature 1. The bearing device for a wheel called third generation includes, as illustrated in FIG. 15, a hub wheel 102 having a flange 101 extending in an radially outer direction, a constant velocity universal joint 104 having an outer joint member 103 fixed to the hub wheel 102, and an outer member 105 arranged on an outer circumferential side of the hub wheel 102.

The constant velocity universal joint 104 includes the outer joint member 103, an inner joint member 108 arranged in a mouth section 107 of the outer joint member 103, a ball 109 arranged between the inner joint member 108 and the outer joint member 103, and a cage 110 that retains the ball 109. A spline section 111 is formed on an inner circumferential surface of a center hole of the inner joint member 108. An end spline section of a shaft (not shown) is inserted into the center hole, whereby the spline section 111 on the inner joint member 108 side and the spline section on the shaft side are engaged.

Further, the hub wheel 102 includes a cylindrical portion 113 and the flange 101. A short-cylindrical pilot section 115, on which a wheel and a brake rotor (not shown) are mounted, is protrudingly provided on an outer end surface 114 (end surface on an outboard side) of the flange 101. Note that, the pilot section 115 includes a large-diameter first portion 115a and a small-diameter second portion 115b. The wheel is externally fitted onto the first portion 115a, and the brake rotor is externally fitted onto the second portion 115b.

Then, a notch section 116 is provided in an outer circumferential surface at an end portion on an inboard side of the cylindrical portion 113. An inner race 117 is fitted in the notch section 116. A first inner raceway surface 118 is provided near a flange on an outer circumferential surface of the cylindrical portion 113 of the hub wheel 102. A second inner raceway surface 119 is provided on an outer circumferential surface of the inner race 117. Further, a bolt inserting hole 112 is provided in the flange 101 of the hub wheel 102. A hub bolt for fixing the wheel and the brake rotor to the flange 101 is inserted into the bolt inserting hole 112.

In the outer member 105, double-row outer raceway surfaces 120 and 121 are provided on an inner circumference thereof, and a flange (vehicle body attachment flange) 132 is provided on an outer circumference thereof. The first outer raceway surface 120 of the outer member 105 and the first inner raceway surface 118 of the hub wheel 102 are opposed to each other. The second outer raceway surface 121 of the outer member 105 and the raceway surface 119 of the inner race 117 are opposed to each other. Rolling elements 122 are interposed between those inner and outer raceway surfaces.

A shaft section 123 of the outer joint member 103 is inserted into the cylindrical portion 113 of the hub wheel 102. In the shaft section 123, a screw section 124 is formed at an end portion on an outboard side thereof. A spline section 125 is formed between the screw section 124 and the mouth section 107. Further, a spline section 126 is formed in an inner circumferential surface (inner surface) of the cylindrical portion 113 of the hub wheel 102. When the shaft section 123 is inserted into the cylindrical portion 113 of the hub wheel 102, the spline section 125 on the shaft section 123 side and the spline section 126 on the hub wheel 102 side are engaged.

A nut member 127 is screwed into the screw section 124 of the shaft section 123 projecting from the cylindrical portion 113. The hub wheel 102 and the outer joint member 103 are connected. In this case, an inner end surface (back surface) 128 of the nut member 127 and an outer end surface 129 of the cylindrical portion 113 come into contact with each other and an end surface 130 on the shaft section side of the mouth section 107 and an outer end surface 131 of the inner race 117 come into contact with each other. In other words, when the nut member 127 is tightened, the hub wheel 102 is sandwiched by the nut member 127 and the mouth section 107 through the inner race 117.

CITATION LIST

Patent Literature 1: JP 2004-340311 A

SUMMARY OF INVENTION

Technical Problem

Conventionally, as described above, the spline section 125 on the shaft section 123 side and the spline section 126 on the hub wheel 102 side are engaged. Therefore, it is necessary to perform spline machining on both the shaft section 123 side and the hub wheel 102 side, and hence cost increases. When the shaft section 123 is press-fitted into the hub wheel 102, recesses and projections of the spline section 125 on the shaft section 123 side and the spline section 126 on the hub wheel 102 side need to be aligned. In this case, if the shaft section 123 is press-fitted into the hub wheel 102 by aligning tooth surfaces thereof, recessed and projected teeth are likely to be damaged (torn off). Further, if the shaft section 123 is press-fitted into the hub wheel 102 by aligning the spline sections to a large diameter of the recessed and projected teeth rather than aligning the tooth surfaces, a backlash in a circumferential direction tends to occur. As described above, if there is the backlash in the circumferential direction in this way, transmissibility of rotation torque is low and abnormal noise tends to occur. Therefore, when the shaft section 123 is press-fitted into the hub wheel 102 by the spline fitting as in the prior art, it is difficult to solve both the damages to the recessed and projected teeth and the backlash in the circumferential direction.

Further, it is necessary for the nut member 127 to be screwed into the screw section 124 of the shaft section 123 projecting from the cylindrical portion 113. Thus, the assembly work involves screw fastening operation, resulting in a rather poor operability. Further, the number of components is large, resulting in a rather poor component controllability.

In view of the above-mentioned problems, the present invention provides a bearing device for a wheel capable of suppressing a backlash in a circumferential direction, excellent in coupling operability of the hub wheel and the outer joint member of the constant velocity universal joint, and excellent in maintenance property by allowing separation of the hub wheel and the outer joint member of the constant velocity universal joint from each other.

Solution to Problem

A first bearing device for a wheel of the present invention includes: a bearing including double-row rolling elements arranged between outer raceways and inner raceways opposed to each other; a hub wheel attached to a wheel; a constant velocity universal joint; and a recess-projection fitting structure through which the hub wheel and a shaft section of an outer joint member of the constant velocity universal joint are separably coupled with each other, the shaft section being inserted in a fitting manner into a hole portion of the hub wheel, in which the recess-projection fitting structure includes: projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween, in which the recess-projection fitting structure allows separation caused by application of a pulling-out force in the axial direction, and in which the hole portion of the hub wheel is provided with an inner wall serving as a bearing surface of a bolt for fixing the constant velocity universal joint.

A second bearing device for a wheel of the present invention includes: a bearing including double-row rolling elements arranged between outer raceways and inner raceways opposed to each other; a hub wheel attached to a wheel; a constant velocity universal joint; and a recess-projection fitting structure through which the hub wheel and a shaft section of an outer joint member of the constant velocity universal joint are separably coupled with each other, the shaft section being inserted in a fitting manner into a hole portion of the hub wheel, in which the recess-projection fitting structure includes: projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween, in which the recess-projection fitting structure allows separation caused by application of a pulling-out force in the axial direction, and in which a foreign-matter intrusion prevention means for preventing a foreign matter from intruding into the recess-projection fitting structure is provided.

A third bearing device for a wheel of the present invention includes: a bearing including double-row rolling elements arranged between outer raceways and inner raceways opposed to each other; a hub wheel attached to a wheel; a constant velocity universal joint; and a recess-projection fitting structure through which the hub wheel and a shaft section of an outer joint member of the constant velocity universal joint are separably coupled with each other, the shaft section being inserted in a fitting manner into a hole portion of the hub wheel, in which the recess-projection fitting structure includes: projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween, in which the recess-projection fitting structure allows separation caused by application of a pulling-out force in the axial direction, and in which a shaft section press-fitting guide structure is provided on a side from which the press-fitting of the projecting portions is started.

According to the bearing devices for a wheel of the present invention, in the recess-projection fitting structure, the entire fitting contact regions between the projecting portions and the recessed portions are held in close contact with each other. Therefore, in this fitting structure, a gap in which a backlash occurs is not formed in a radial direction and a circumferential direction. In addition, when the pulling-out force in the axial direction is applied to the shaft section of the outer joint member, the outer joint member can be detached from the hole portion of the hub wheel. Further, when the shaft section of the outer joint member is re-press-fitted into the hole portion of the hub wheel after pulling out the shaft section of the outer joint member from the hole portion of the hub wheel, it is possible to form the recess-projection fitting structure in which the projecting portions and the recessed portions are held in close contact with each other through the entire region of the fitting contact regions.

Further, according to the second bearing device for a wheel, owing to provision of the foreign-matter intrusion prevention means, it is possible to prevent foreign matters from intruding into the recess-projection fitting structure.

Further, according to the third bearing device for a wheel, the shaft section press-fitting guide structure is provided on the side from which press-fitting of the projecting portions is started, and hence it is possible to press-fit the shaft section into the hole portion of the hub wheel along the shaft section press-fitting guide structure.

In each of the bearing devices for a wheel, it is preferred that the hub wheel and the shaft section of the outer joint member be fixed to each other with a screw structure. With this, after the press-fitting, the shaft section of the outer joint member is regulated from slipping off from the hub wheel in the axial direction. It is preferred that, during re-press-fitting after the separation, press-fitting with forward screwing of the screw structure be possible. With this, it is possible to press-fit the shaft section of the outer joint member into the hole portion of the hub wheel without use of a press machine for press-fitting, etc.

It is preferred that the shaft section press-fitting guide structure in the third bearing device for a wheel include guide recessed portions fitting to the projecting portions, and conform a phase of the projecting portions as one side to a phase of the recessed portions as another side. In the bearing device for a wheel including the shaft section press-fitting guide structure as described above, when the shaft section of the outer joint member is re-press-fitted into the hole portion of the hub wheel after pulling out the shaft section of the outer joint member from the hole portion of the hub wheel, a phase of the projecting portions as one side and a phase of the recessed portions as the another side are conformed to each other. Therefore, during the re-press-fitting, the shaft section is fitted into the recessed portions formed by previous press-fitting, and does not damage the recessed portions.

Further, it is preferred that, in the shaft section press-fitting guide structure, in a state in which the projecting portions fit in the guide recessed portions, radial gaps be formed between vertexes of the projecting portions and bottoms of the guide recessed portions, circumferential gaps be formed between side portions of the projecting portions and side portions of the guide recessed portions, or the radial gaps be formed between the vertexes of the projecting portions and the bottoms of the guide recessed portions and the circumferential gaps be formed between the side portions of the projecting portions and the side portions of the guide recessed portions. Owing to formation of such gaps, the projecting portions can be easily fitted into the guide recessed portions in a step prior to press-fitting. In addition, the guide recessed portions do not inhibit press-fitting of the projecting portions.

Further, in the shaft section press-fitting guide structure, end portions of the guide recessed portions on a side of the recess-projection fitting structure may be formed into flat surfaces which are orthogonal to a press-fitting direction, or inclined surfaces which are inclined and reduced in diameter along the press-fitting direction. In a case of the flat surfaces orthogonal to the press-fitting direction, the shaft section can be received by the flat surfaces when the shaft section is press-fitted into the hole portion. Further, in a case of the inclined surfaces, the projecting portions can be stably fitted into the recessed portions as a counterpart side from the guide recessed portions.

Further, in the shaft section press-fitting guide structure, a radial depth of the guide recessed portions may be reduced in diameter along the press-fitting direction. With this, it is possible to stably press-fit the projecting portions into the recessed portions as the counterpart side from the guide recessed portions.

In each of the bearing devices for a wheel, it is preferred that an end portion of the hub wheel be forged so as to apply precompression to the roller bearing externally fitted onto the hub wheel. In this case, it is preferred to provide a gap between a mouth section of the outer joint member and a forged section formed by forging the end portion of the hub wheel. Further, it is preferred to arrange a seal member (seal member constituting the foreign-matter intrusion prevention means) for sealing the gap.

It is preferred to interpose a seal material (seal member constituting the foreign-matter intrusion prevention means) between the inner wall and a bearing surface of a bolt member of a screw structure for fixing the hub wheel and the shaft section of the outer joint member to each other.

The projecting portions of the recess-projection fitting structure can be provided on the shaft section of the outer joint member, and hardness of at least press-fitting start end portions of the projecting portions can be set to be higher than hardness of a radially inner portion of the hole portion of the hub wheel. In this case, by press-fitting the shaft section into the hole portion of the hub wheel from an axial end portion side of the projecting portions, the projecting portions form the recessed portions, which are held in close contact with the projecting portions in a fitting manner, in the inner surface of the hole portion of the hub wheel. Thus, it is possible to form the recess-projection fitting structure. In this case, the projecting portions bite in a recessed-portion forming surface as the counterpart side (inner surface of the hole portion of the hub wheel), and thus the hole portion is slightly expanded in diameter and allows movement in the axial direction of the projecting portions. If the movement in the axial direction stops, the hole portion is reduced in diameter to return to the original diameter. In this manner, the entire fitting contact regions between the projecting portions and the recessed portions are stably held in close contact with each other.

When the projecting portions are provided on the shaft section of the outer joint member, it is preferred that an inner diameter dimension of the inner surface of the hole portion of the hub wheel be set to be smaller than a diameter dimension of a circle connecting vertexes of the projecting portions of the shaft section of the outer joint member, and to be larger than a diameter dimension of a circle connecting bottoms between the projecting portions.

Further, the projecting portions of the recess-projection fitting structure can be provided on the inner surface of the hole portion of the hub wheel, and hardness of at least press-fitting start end portions of the projecting portions can be set to be higher than hardness of a radially outer portion of the shaft section of the outer joint member of the constant velocity universal joint. In this case, by press-fitting the shaft section into the hole portion of the hub wheel from the axial end portion side of the projecting portions, the projecting portions form the recessed portions, which are held in close contact with the projecting portions in a fitting manner, in the outer surface of the shaft section of the outer joint member. Thus, it is possible to form the recess-projection fitting structure. In this case, the projecting portions bite in the outer surface of the shaft section, and thus the hole portion of the hub wheel is slightly expanded in diameter and allows movement in the axial direction of the projecting portions. If the movement in the axial direction stops, the hole portion is reduced in diameter to return to the original diameter. In this manner, the entire fitting contact regions between the projecting portions and the recessed portions, which are a counterpart member fitting to the projecting portions (outer surface of the shaft), are held in close contact with each other.

When the projecting portions are provided on the inner surface of the hole portion of the hub wheel, it is preferred that an outer diameter dimension of the shaft section of the outer joint member be set to be larger than a diameter dimension of a circular arc connecting vertexes of the plurality of projecting portions of the hole portion of the hub wheel, and to be smaller than a diameter dimension of a circle connecting bottoms between the projecting portions.

It is preferred to provide a housing section for housing an extruded portion generated by formation of the recessed portions caused by the press-fitting. In this case, the extruded portion includes a part of material having a volume equal to that of the recessed portions into (to) which recessed-portion fitting regions of the projecting portions are fitted, the part including: a material forced out from the recessed portions to be formed; a material trimmed for forming the recessed portions; a material forced out and trimmed; or the like. Therefore, when the projecting portions are provided on the shaft section of the outer joint member, the housing section is provided on the shaft section on the outboard side with respect to the recess-projection fitting structure. When the projecting portions are provided on the inner surface of the hole portion of the hub wheel, the housing section is provided on the inner surface of the hole portion of the hub wheel on the inboard side with respect to the recess-projection fitting structure.

It is preferred that, of the projecting portions, at least portions ranging from the vertexes to middle portions in a projecting direction be press-fitted to the another of the outer surface of the shaft section of the outer joint member and the inner surface of the hole portion of the hub wheel, and that circumferential thicknesses of the middle portions in the projecting direction be set to be smaller than circumferential dimensions in positions corresponding to the middle portions in between the projecting portions adjacent to one another in a circumferential direction. By this setting, a sum of the circumferential thicknesses of the middle portions in the projecting direction of the projecting portions is smaller than a sum of circumferential thicknesses in the positions corresponding to the middle portions in the projecting portions as the counterpart side which fit in between the projecting portions adjacent thereto in the circumferential direction.

It is preferred that the recess-projection fitting structure be arranged at an immediate-underside avoiding position with respect to raceway surfaces of the roller bearing. This is because, when the shaft section is press-fitted into the hole portion of the hub wheel, the hub wheel expands. As a result of the expansion, hoop stress is generated on the raceway surfaces of the roller bearing. Incidentally, the hoop stress represents a force of expanding a diameter in the radially outer direction. Thus, when hoop stress is generated on the raceway surfaces of the bearing, reduction of rolling fatigue life and occurrence of cracks may be caused. In this context, by arranging the recess-projection fitting structure at the immediate-underside avoiding position with respect to the raceway surfaces of the roller bearing, hoop stress on the raceway surfaces of the bearing can be suppressed.

It is preferred that the hardness of the at least press-fitting start end portions of the projecting portions be set to be higher than hardness of a recessed-portion forming region into which the projecting portions are press-fitted, and that a hardness difference therebetween be set to be equal to or larger than 20 points in HRC. Thus, when the projecting portions are press-fitted into the counterpart side, it is possible to perform press-fitting only by applying a relatively small press-fitting force (press-fitting load). Further, it is unnecessary to apply large press-fitting load, and hence it is possible to prevent recessed and projected teeth to be formed from being damaged (torn off).

Advantageous Effects of Invention

According to the present invention, in the recess-projection fitting structure, there are formed no gaps in which a backlash occurs in a radial direction and a circumferential direction. Thus, the entire fitting regions contribute to rotation torque transmission, and hence stable torque transmission is achieved. In addition, abnormal noise is not generated. Moreover, close contact with no gaps is achieved in the recess-projection fitting structure, and hence strength of torque transmission regions is increased. Therefore, the bearing device for a wheel can be reduced in weight and size.

Further, the outer joint member can be detached from the hole portion of the hub wheel by application of the pulling-out force in the axial direction to the shaft section of the outer joint member. Thus, it is possible to improve operability in repair and inspection of the components (maintenance property). In addition, by re-press-fitting the shaft section of the outer joint member into the hole portion of the hub wheel after the repair and inspection of the components, it is possible to form the recess-projection fitting structure in which the projecting portions and the recessed portions are held in close contact with each other through the entire region of the fitting contact regions. Thus, it is possible to re-structure a bearing device for a wheel capable of performing stable torque transmission.

The projecting portions provided on the one of the outer surface of the shaft section of the outer joint member and the inner surface of the hole portion of the hub wheel are press-fitted along the axial direction into the another of the outer surface of the shaft section of the outer joint member and the inner surface of the hole portion of the hub wheel. With this, it is possible to form recessed portions to be held in close contact with the projecting portions in a fitting manner, and hence possible to reliably form the recess-projection fitting structure. In addition, it is unnecessary to form the spline sections and the like on the member in which the recessed portions are formed. The bearing device for a wheel is excellent in productivity. Further, phase alignment of the splines is unnecessary. It is possible to achieve improvement of assembly property, to thereby prevent damages to the tooth surfaces during press-fitting, and hence possible to maintain a stable fitting state.

As a result of fixation with the screw structure, the shaft section is regulated from slipping off from the hub wheel in the axial direction after the press-fitting, and hence stable torque transmission is possible over a long period of time.

Further, in the bearing device for a wheel in which the end portion of the hub wheel is forged so as to apply precompression to the roller bearing, it is unnecessary to apply precompression to the inner race from the mouth section of the outer joint member. Thus, without consideration of precompression to the inner race, the shaft section of the outer joint member can be press-fitted, and a coupling property (assemblability) of the hub wheel and the outer joint member can be improved. The mouth section is kept out of contact with the hub wheel, and hence it is possible to prevent generation of abnormal noise due to contact between the mouth section and the hub wheel.

Owing to provision of the foreign-matter intrusion prevention means, it is possible to prevent foreign matters from intruding into the recess-projection fitting structure. That is, the foreign-matter intrusion prevention means prevents intrusion of rainwater and foreign matters, and it is possible to avoid deterioration of adhesiveness caused by the rainwater, foreign matters, etc. intruding into the recess-projection fitting structure.

In the bearing device for a wheel in which the seal member is arranged between the end portion of the hub wheel and the bottom portion of the mouth section, the seal member closes the gap between the end portion of the hub wheel and the bottom portion of the mouth section. Thus, rainwater and foreign matters are prevented from intruding into the recess-projection fitting structure through the gap. Any member can be used as the seal member as long as the member can be interposed between the end portion of the hub wheel and the bottom portion of the mouth section, and hence it is possible to use, for example, an existing (commercial) O-ring, and to form the foreign-matter intrusion prevention means at low cost. Moreover, the commercial O-ring and the like can be selected from ones that have various sizes and are made of various materials. Without separately manufacturing a special member, it is possible to form the foreign-matter intrusion prevention means reliably exerting a sealing function.

The gap between the mouth section of the outer joint member and the forged section formed by forging the end portion of the hub wheel is sealed with the seal member. Thus, it is possible to prevent intrusion of rainwater and foreign matters from the gap, and hence possible to avoid deterioration of adhesiveness caused by the rainwater, foreign matters, etc. intruding into the recess-projection fitting structure. A seal material is interposed between the inner wall and the bearing surface of the bolt member of the screw structure, and hence it is possible to prevent rainwater and foreign matters from intruding into the recess-projection fitting structure from the bolt member. As a result, quality of the bearing device for a wheel can be improved.

Further, owing to provision of the shaft section press-fitting guide structure, the shaft section can be press-fitted into the hole portion of the hub wheel along the shaft section press-fitting guide structure. With this, stable press-fitting is possible, and decentering and center inclination can be prevented.

In a case of including the guide recessed portions for conforming the phase of the projecting portions as one side to the phase of the recessed portions as the other side, when the shaft section of the outer joint member is re-press-fitted into the hole portion of the hub wheel, the shaft section is press-fitted in the recessed portions formed by previous press-fitting, and does not damage the recessed portions. Therefore, it is possible to re-configure with high accuracy the recess-projection fitting structure without the gap in which a backlash occurs in the radial direction and the circumferential direction.

The gaps are formed, for example, between the vertexes of the projecting portions and the bottoms of the guide recessed portions, and thus the projecting portions can be easily fitted into the guide recessed portions in a step prior to press-fitting. In addition, the guide recessed portions do not inhibit press-fitting of the projecting portions. Therefore, it is possible to realize improvement of assembly property.

In a case where the end portions on the recess-projection fitting structure side of the guide recessed portions are formed into the flat surfaces orthogonal to the press-fitting direction, it is possible to receive the shaft section by the flat surfaces, and press-fitting is stably performed at the start of the press-fitting. Further, in a case of being formed into the inclined surfaces, it is possible to stably fit the projecting portions into the recessed portions as the counterpart side from the guide recessed portions, and press-fitting operation can be stabilized.

Also in the bearing device for a wheel in which the radial depth of the guide recessed portions is reduced in diameter in the press-fitting direction, it is possible to stably fit the projecting portions into the recessed portions as the counterpart side from the guide recessed portions.

Further, when the projecting portions of the recess-projection fitting structure are provided on the shaft section of the outer joint member, it is possible to increase hardness on the shaft section side and to improve rigidity of the shaft section. In contrast, when the projecting portions of the recess-projection fitting structure are provided on the inner surface of the hole portion of the hub wheel, it is unnecessary to perform hardness treatment (thermal treatment) on the shaft section side. Therefore, the outer joint member of the constant velocity universal joint is excellent in productivity.

By setting the circumferential thicknesses of the middle portions in the projecting direction of the projecting portions to be smaller than the dimensions in positions corresponding to the middle portions in between the projecting portions adjacent to one another in the circumferential direction, it is possible to increase the circumferential thicknesses in between the projecting portions adjacent to one another in the circumferential direction. Therefore, it is possible to increase a shearing area in between the projecting portions adjacent to one another in the circumferential direction, and to secure torsional strength. In addition, tooth thicknesses (circumferential thicknesses) of the projecting portions on the higher hardness side are small, and hence it is possible to reduce press-fitting load and to achieve improvement of press-fitting property.

By providing the housing section (pocket section) for housing the extruded portion generated by formation of the recessed portions caused by the press-fitting, it is possible to hold (maintain) the extruded portion in the housing section. Therefore, the extruded portion does not intrude into the vehicle and the like on the outside of the device. That is, it is possible to keep the extruded portion to be housed in the housing section, and hence unnecessary to perform removal processing for the extruded portion, and possible to achieve a reduction in the number of worker-hours for assembly and achieve improvement of assembly operability and cost reduction.

By arranging the recess-projection fitting structure at the immediate-underside avoiding position with respect to the raceway surfaces of the roller bearing, hoop stress on the raceway surfaces of the bearing is suppressed. With this, it is possible to prevent occurrence of failures with a bearing, such as reduction of rolling fatigue life, occurrence of cracks, and stress corrosion crack, and hence possible to provide a bearing of high quality.

A hardness difference between the press-fitting start end portions and the recessed-portion forming region into which the projecting portions are press-fitted is set to be equal to or larger than 20 points in HRC. Thus, when the projecting portions are press-fitted into the counterpart side, it is possible to perform press-fitting only by applying a relatively small press-fitting force (press-fitting load), and to improve a press-fitting property. Further, it is unnecessary to apply large press-fitting load, and hence it is possible to prevent the recessed and projected teeth to be formed from being damaged (torn off), and to stably form the recess-projection fitting structure without a gap in which a backlash occurs in the radial direction and the circumferential direction.

DETAILED DESCRIPTION OF THE INVENTION

Figure 1:
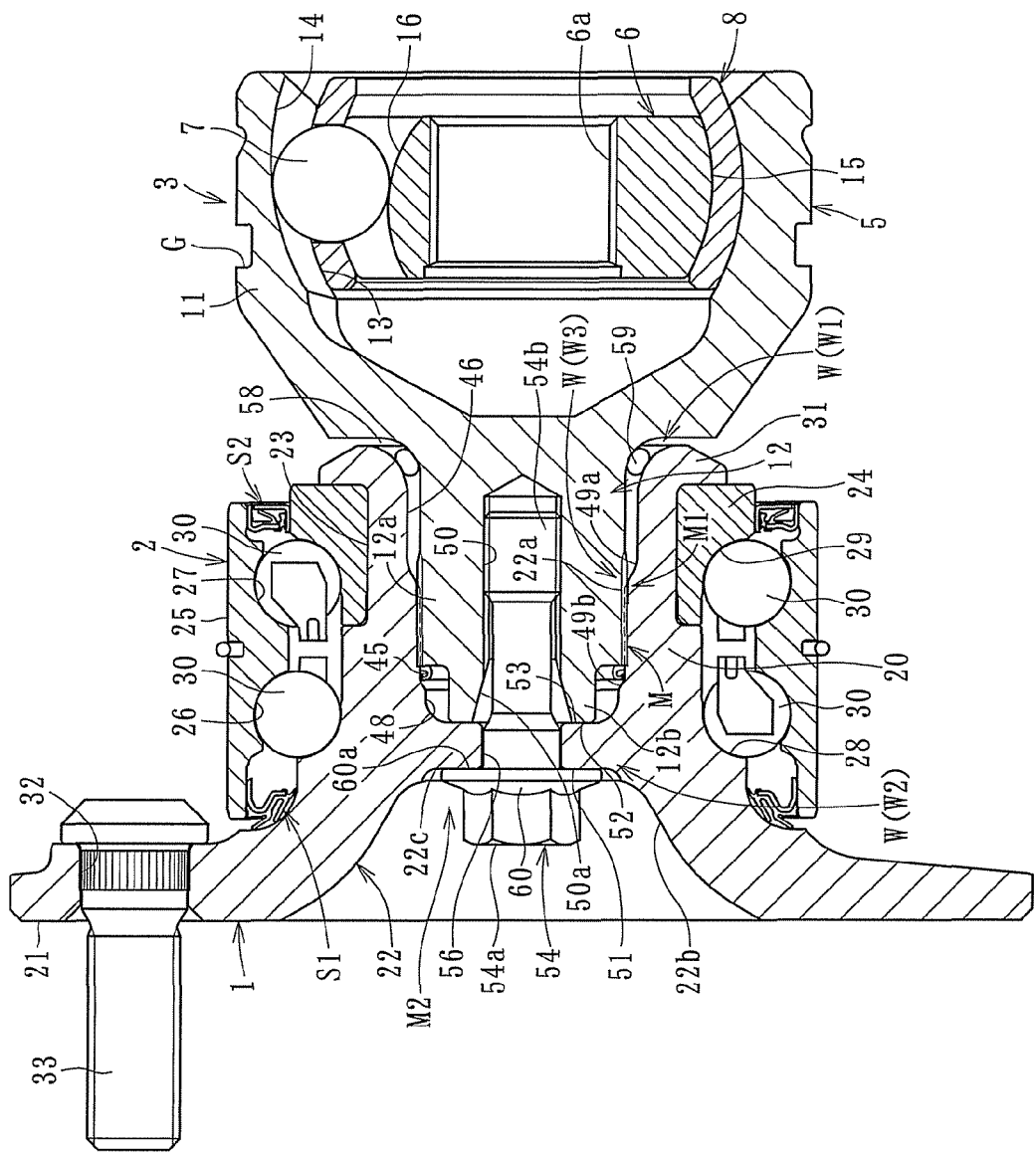
FIG. 1 A vertical sectional view of a bearing device for a wheel according to a first embodiment of the present invention.

Embodiments of the present invention are described below with reference to FIGS. 1 to 14. A bearing device for a wheel according to a first embodiment is illustrated in FIG. 1. In this bearing device for a wheel, a hub wheel 1, a double-row roller bearing 2, and a constant velocity universal joint 3 are united together. Further, the hub wheel 1 and a shaft section 12 of an outer joint member of the constant velocity universal joint 3 inserted to a hole portion 22 of the hub wheel 1 are separably coupled with each other through a recess-projection fitting structure M.

Figure 8:
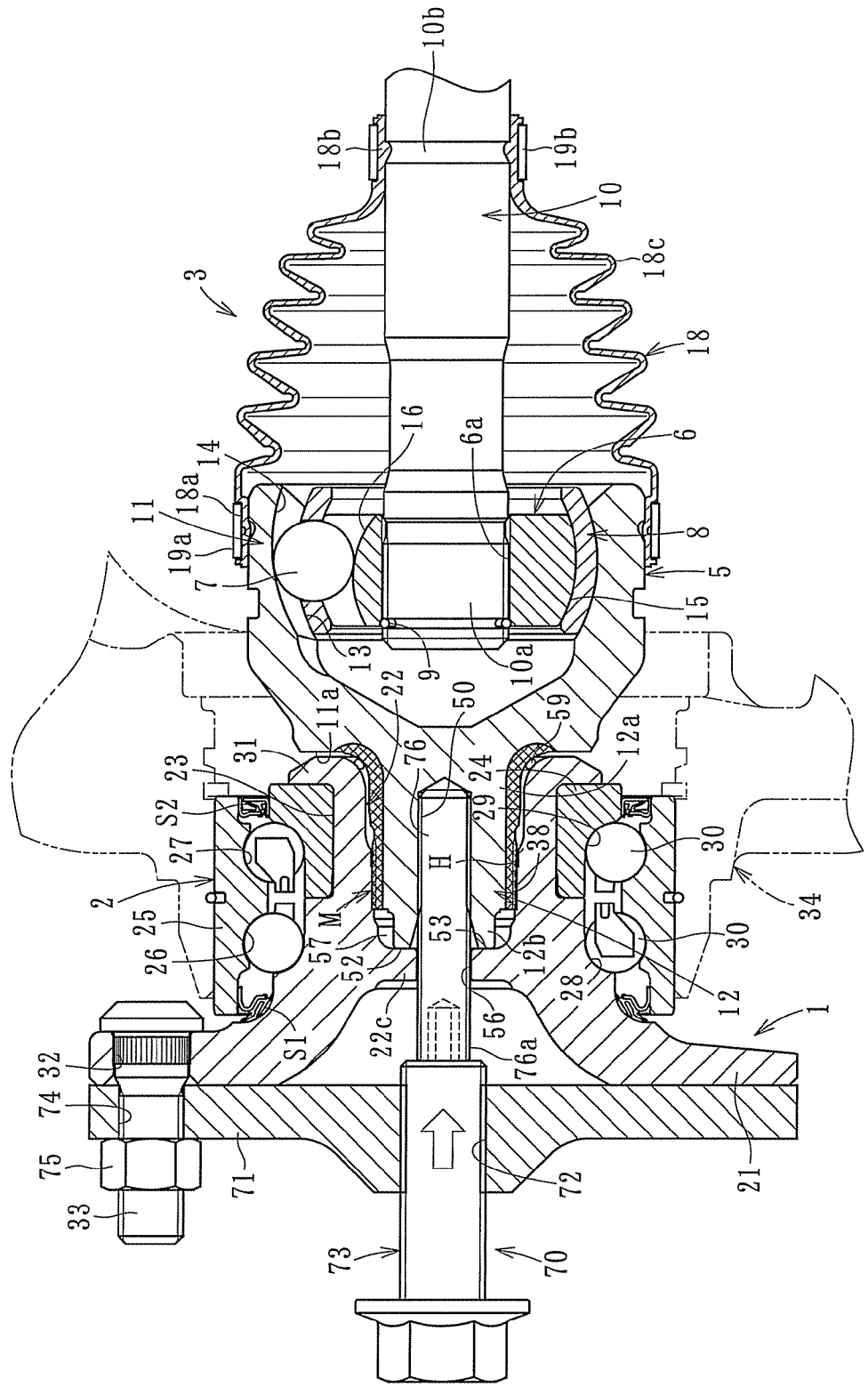
FIG. 8 A sectional view illustrating a separation method for the recess-projection fitting structure.

The constant velocity universal joint 3 mainly includes an outer race 5 as an outer joint member, an inner race 6 as an inner joint member arranged on the inner side of the outer race 5, a plurality of balls 7 provided between the outer race 5 and the inner race 6 to transmit torque, and a cage 8 provided between the outer race 5 and the inner race 6 to retain the balls 7. As illustrated in FIG. 8 or the like, an end portion 10a of a shaft 10 is press-fitted into a shaft hole inner diameter 6a of the inner race 6 to affect spline fitting, whereby connection with the shaft 10 is affected so as to allow torque transmission. A stop ring 9 for preventing shaft slipping-off is fitted in the end portion 10a of the shaft 10.

The outer race 5 includes a mouth section 11 and a stem section (shaft section) 12, and the mouth section 11 is formed in a cup-like shape open at its one end. In an inner spherical surface 13 thereof, there are formed a plurality of axially extending track grooves 14 at equal circumferential intervals. The inner race 6 has in an outer spherical surface 15 thereof a plurality of axially extending track grooves 16 formed at equal circumferential intervals.

The track grooves 14 of the outer race 5 and the track grooves 16 of the inner race 6 are paired with each other, and one ball 7 as a torque transmission element is incorporated into a ball track formed by each pair of track grooves 14 and 16 so as to be capable of rolling. The balls 7 are provided between the track grooves 14 of the outer race 5 and the track grooves 16 of the inner race 6 to transmit torque. The cage 8 is slidably provided between the outer race 5 and the inner race 6, with an outer spherical surface thereof coming into contact with the inner spherical surface 13 of the outer race 5 and an inner spherical surface thereof coming into contact with the outer spherical surface 15 of the inner race 6. While in this case the constant velocity universal joint is of the Rzeppa type, it is also possible to adopt a constant velocity universal joint of some other type such as the undercut free type, in which each of the track grooves 14 and 16 has a linear straight section provided to a groove bottom.

Further, as illustrated in FIG. 8 or the like, the opening portion of the mouth section 11 is closed by a boot 18. The boot 18 includes a larger diameter portion 18a, a smaller diameter portion 18b, and a bellows portion 18c for coupling the larger diameter portion 18a and the smaller diameter portion 18b. The larger diameter portion 18a is externally fitted to the opening portion of the mouth section 11, and fastened with a boot band 19a in this state. The smaller diameter portion 18b is externally fitted to a boot mount portion 10b of the shaft 10, and fastened with a boot band 19b in this state.

Figure 7:
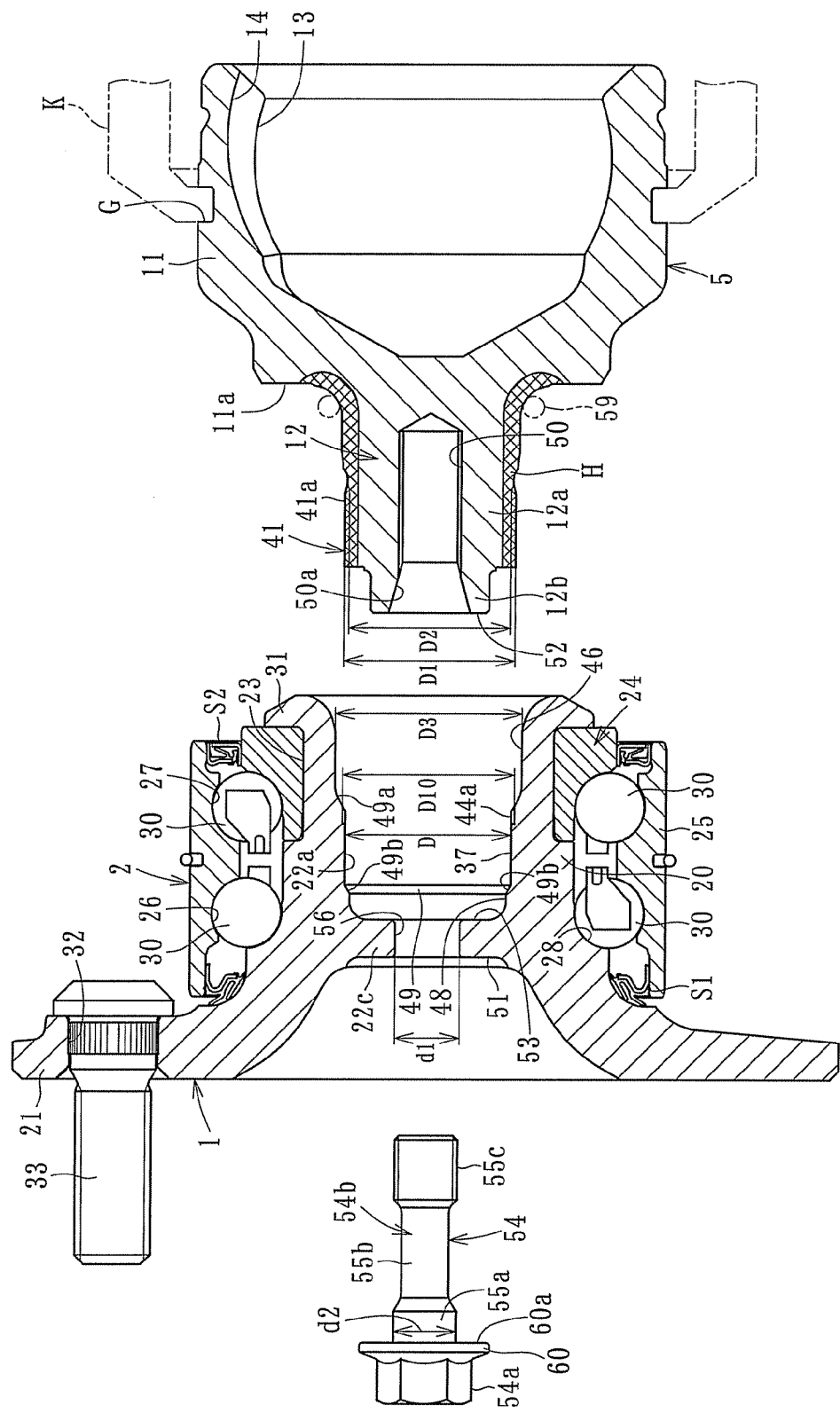
FIG. 7 A sectional view of the bearing device for a wheel prior to assembly.

As illustrated in FIGS. 1 and 7, the hub wheel 1 includes a cylindrical portion 20, a flange 21 provided to an end portion on an outboard side of the cylindrical portion 20. A hole portion 22 of the cylindrical portion 20 includes a shaft section fitting hole 22a, a tapered hole 22b on the outboard side, and an inner wall 22c formed between the shaft section fitting hole 22a and the tapered hole 22b and projecting in a radially inner direction. That is, in the shaft section fitting hole 22a, through the recess-projection fitting structure M described later, the shaft section 12 of the outer race 5 of the constant velocity universal joint 3 and the hub wheel 1 are coupled with each other. Thus, the inner wall 22c constitutes a bearing surface of a bolt for fixing the constant velocity universal joint. A recessed portion 51 is provided in an end surface on the outboard side of the inner wall 22c. Note that, an outer side of the bearing device relative to a vehicle when the bearing device is mounted on the vehicle such as an automobile is referred to as an "outboard side", and an inner side of the bearing device relative to a vehicle when the bearing device is mounted on the vehicle such as an automobile is referred to as an "inboard side".

The hole portion 22 includes a larger diameter portion 46 on an opening side on an opposite inner-wall-side thereof with respect to the shaft section fitting hole 22a, and a smaller diameter portion 48 on an inner wall side with respect to the shaft section fitting hole 22a. A tapered portion (tapered hole) 49a is provided between the larger diameter portion 46 and the shaft section fitting hole 22a. The tapered portion 49a is reduced in diameter along a press-fitting direction at the time of coupling the hub wheel 1 and the shaft section 12 of the outer race 5.

The roller bearing 2 includes an inner member having an inner race 24 fitted to a smaller-diameter step portion 23 provided on the inboard side of the cylindrical portion 20 of the hub wheel 1, and an outer member 25 externally fitted to both of the cylindrical portion 20 of the hub wheel 1 and the inner race 24. In the outer member 25, outer raceway surfaces (outer raceways) 26 and 27 in two rows are provided on an inner circumference thereof. The first outer raceway surface 26 and a first inner raceway surface (inner raceway) 28 provided on an outer circumference of the shaft section of the hub wheel 1 are opposed to each other. The second outer raceway surface 27 and a second inner raceway surface (inner raceway) 29 provided on an outer circumferential surface of the inner race 24 are opposed to each other. Balls as rolling elements 30 are interposed between the first outer raceway surface 26 and the first inner raceway surface 28 and between the second outer raceway surface 27 and the second inner raceway surface 29. That is, a part (outer surface of the cylindrical portion 20) of the hub wheel 1 and the inner race 24 press-fitted to the outer circumference of the end portion on the inboard side of the hub wheel 1 constitute the inner member including the inner raceways 28 and 29. Note that, seal members S1 and S2 are mounted to both opening portions of the outer member 25, respectively. Further, a knuckle 34 (see FIG. 8) extending from a suspension device of a vehicle body (not shown) is attached to the outer member 25, that is, the outer race.

In this case, the end portion on the inboard side of the hub wheel 1 is forged, whereby precompression is applied to the bearing 2 by a forged section 31. Consequently, the inner race 24 can be fastened to the hub wheel 1. Further, a bolt inserting hole 32 is provided in the flange 21 of the hub wheel 1, and a hub bolt 33 for fixing a wheel and a brake rotor to the flange 21 is inserted into the bolt inserting hole 32. Note that, the forged section 31 is formed by orbital forming. The orbital forming is a method of performing plastic deformation while rotating a punch (forging jig) about its center axis with respect to a center axis of the hub wheel 1.

A threaded hole 50 opened in an end surface on the outboard side (opposite mouth-section-side) is provided in an axial center portion of the shaft section 12 of the outer race 5. An opening portion of the threaded hole 50 is formed as a tapered portion 50a opening in an enlarged manner toward the opening. Further, a smaller diameter portion 12b is formed at an end portion on the outboard side (opposite mouth-section-side) of the shaft section 12. That is, the shaft section 12 includes a body portion 12a larger in diameter and the smaller diameter portion 12b.

Figure 2:
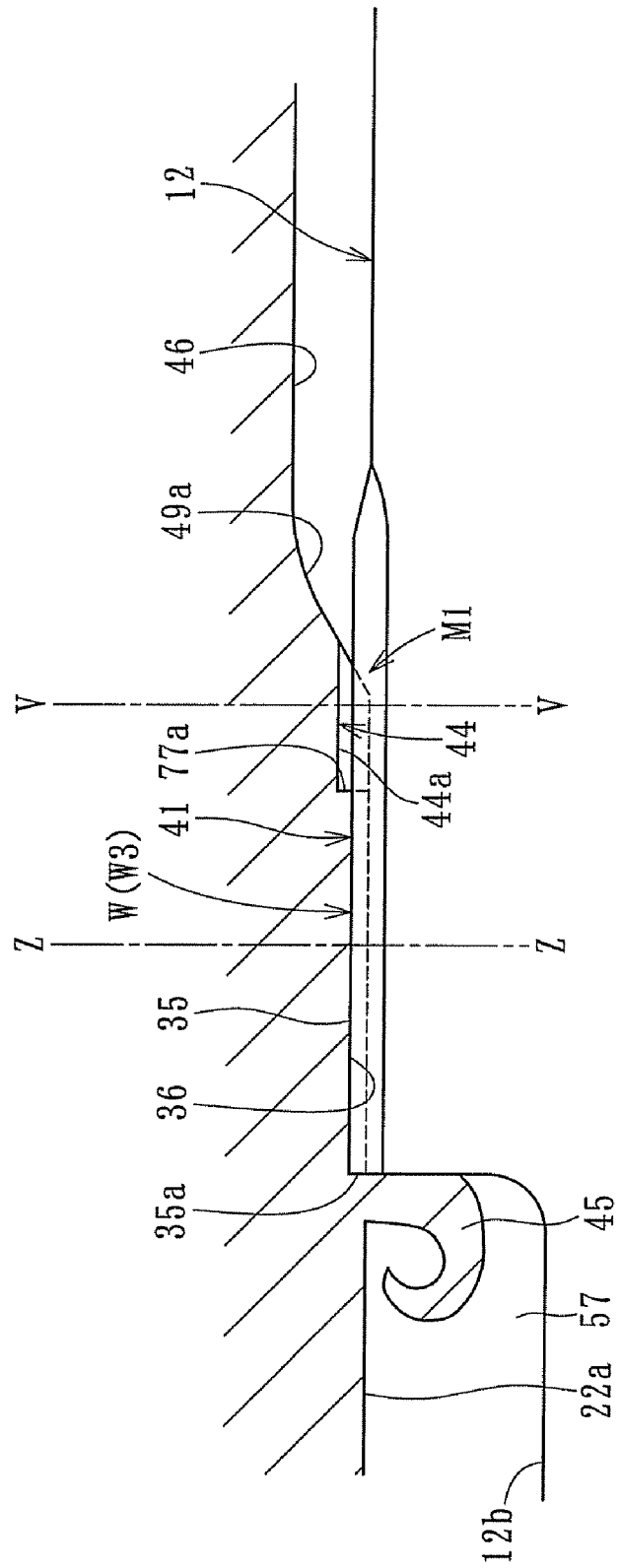
FIG. 2 An enlarged vertical sectional view of a recess-projection fitting structure.

As illustrated in FIGS. 2 and 3, the recess-projection fitting structure M includes, for example, projecting portions 35 provided on the shaft section 12 to extend in the axial direction and recessed portions 36 formed in an inner surface of the hole portion 22 of the hub wheel 1 (inner surface 37 of the shaft section fitting hole 22a, in this case). The projecting portions 35 and the recessed portions 36 of the hub wheel 1 are held in close contact with each other through the entire region of fitting contact regions 38 therebetween, the recessed portions 36 fitting to the projecting portions 35. That is, the plurality of projecting portions 35 are arranged at predetermined pitches along a circumferential direction on an outer circumferential surface on the opposite mouth-section-side of the shaft section 12, and the plurality of recessed portions 36 are formed along the circumferential direction, which allow the projecting portions 35 to fit to the inner surface 37 of the shaft section fitting hole 22a of the hole portion 22 of the hub wheel 1. That is, over the entire circumferential direction, the projecting portions 35 and the recessed portions 36 fitting thereto tightly fit to each other.

Figure 3A:
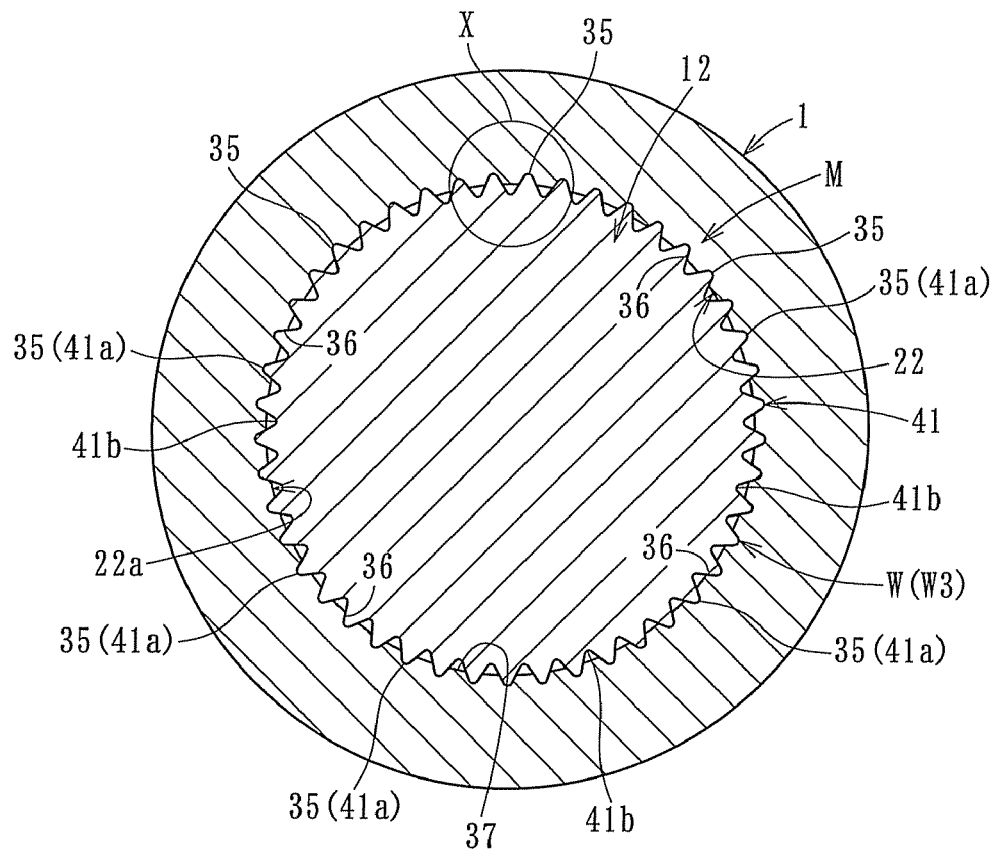
FIG. 3A A sectional view taken along the line Z-Z of FIG. 2, illustrating the recess-projection fitting structure of the bearing device for a wheel.
Figure 3B:
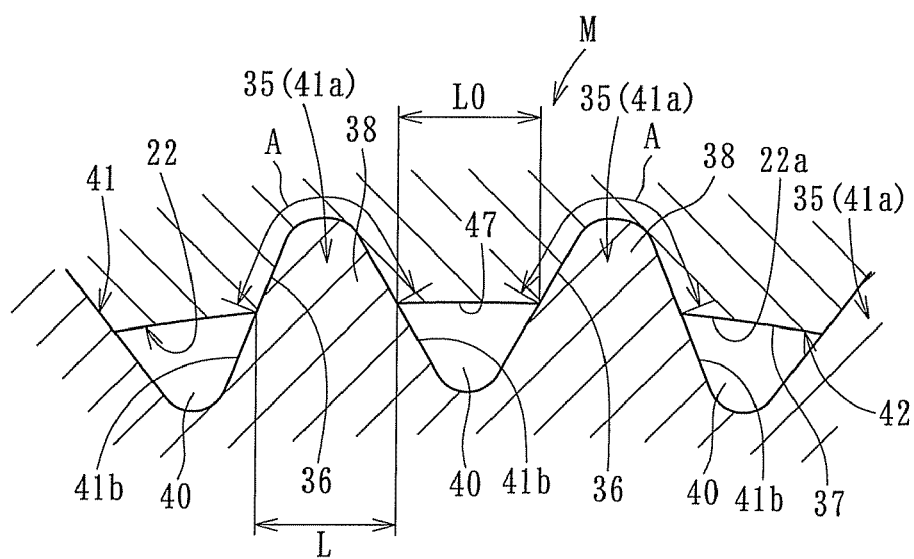
FIG. 3B An enlarged view of the X section of the recess-projection fitting structure illustrated in FIG. 3A.

In this case, each of the projecting portions 35 is formed into a triangular shape (ridge shape) having a vertex of a convex round shape in cross-section, and the fitting contact regions (recessed-portion fitting regions) 38 of the projecting portions 35 are illustrated as ranges A in FIG. 3B, the ranges extending from a midslope portion to a summit of the ridge shape in cross-section. Further, between the projecting portions 35 adjacent to each other in the circumferential direction, gaps 40 are formed on the radially inner side with respect to the inner surface 37 of the hub wheel 1.

As described above, the hub wheel 1 and the shaft section 12 of the outer race 5 of the constant velocity universal joint 3 can be coupled with each other through the recess-projection fitting structure M. In this case, as described above, the end portion on the inboard side of the hub wheel 1 is forged, and the forged section 31 thus formed applies precompression to the roller bearing 2. Thus, it is unnecessary to apply precompression to the inner race 24 at the mouth section 11 of the outer race 5, and the mouth section 11 is kept out of contact with the end portion of the hub wheel 1 (forged section 31, in this case). Thus, a gap 58 is formed between the forged section 31 of the hub wheel 1 and a back surface 11a of the mouth section 11.

Further, a bolt member 54 is screwed into the threaded hole 50 of the shaft section 12 from the outboard side. As illustrated in FIG. 1, the bolt member 54 includes a flanged head portion 54a and a screw shaft portion 54b. As illustrated in FIG. 7, the screw shaft portion 54b includes a larger-diameter proximal portion 55a, a smaller-diameter body portion 55b, and a screw portion 55c on a distal end side. In this case, a through-hole 56 is provided in the inner wall 22c, and the screw shaft portion 54b of the bolt member 54 is inserted into the through-hole 56. With this, the screw portion 55c is screwed into the threaded hole 50 of the shaft section 12. A hole diameter d1 of the through-hole 56 is set to be slightly larger than an outer diameter d2 of the larger-diameter proximal portion 55a of the screw shaft portion 54b. Specifically, the diameters are set within a range of 0.05 mm<d1-d2<0.5 mm. Note that, a maximum outer diameter of the screw portion 55c is equal to an outer diameter of the larger-diameter proximal portion 55a or slightly smaller than the outer diameter of the proximal portion 55a.

Figure 4A:
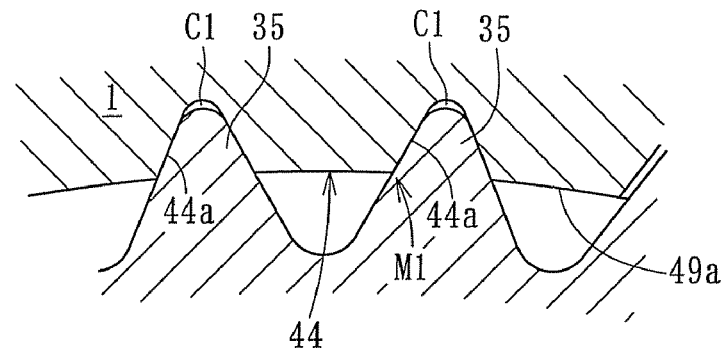
FIG. 4A A sectional view taken along the line V-V of FIG. 2, illustrating a shaft section press-fitting guide structure of the bearing device for a wheel.

In the bearing device for a wheel, as illustrated in FIG. 2, a shaft section press-fitting guide structure M1 for guiding press-fitting of the shaft section 12 during press-fitting is provided on a side from which press-fitting of the projecting portions is started. In this case, the shaft section press-fitting guide structure M1 includes a female spline 44 provided in the tapered portion 49a of the hole portion 22. That is, as illustrated in FIG. 4A, guide recessed portions 44a are provided at predetermined pitches (in this case, the same pitches as arrangement pitches of the projecting portions 35) along the circumferential direction on the shaft section fitting hole 22a side of the tapered portion 49a.

In this case, as illustrated in FIG. 7, a bottom diameter dimension D10 of the guide recessed portions 44a is set to be larger than a maximum outer diameter of the projecting portions 35, i.e., a diameter dimension (circumscribed circle diameter) D1 of a circle connecting vertexes of the projecting portions 35 as projecting portions 41a of a spline 41. Consequently, as illustrated in FIG. 4A, radial gaps C1 are formed between the vertexes of the projecting portions 35 and bottoms of the guide recessed portions 44a.

Figure 6A:
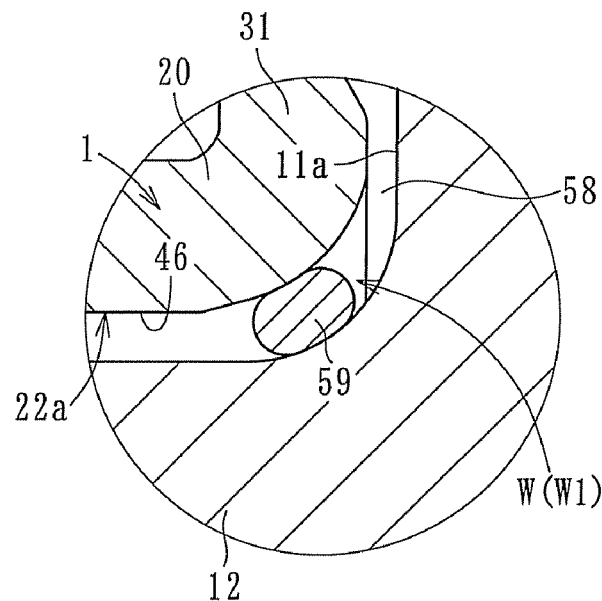
FIG. 6A An enlarged sectional view of a seal member for sealing a gap between a mouth section of an outer race and a forged section of a hub wheel in the bearing device for a wheel, the seal member being an O-ring.
Figure 6B:
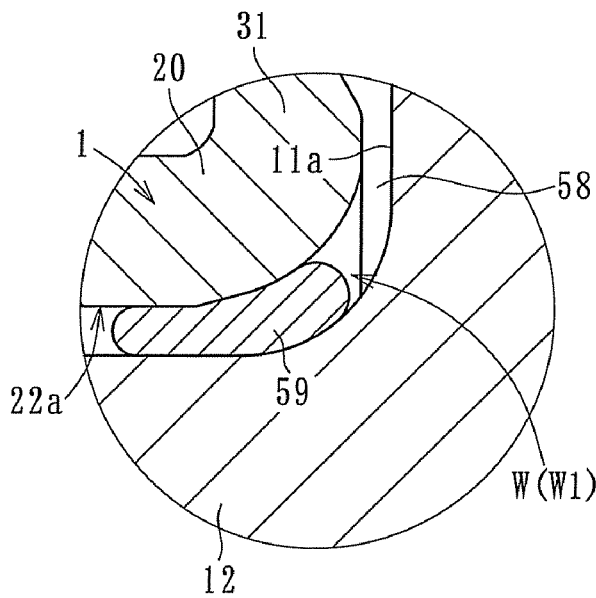
FIG. 6B An enlarged sectional view of the seal member for sealing the gap between the mouth section of the outer race and the forged section of the hub wheel in the bearing device for a wheel, the seal member being a gasket.

Incidentally, in the bearing device for a wheel, foreign-matter intrusion prevention means W for preventing a foreign-matter from intruding into the recess-projection fitting structure M are respectively provided on the inboard side with respect to the recess-projection fitting structure M and the outboard side with respect to the recess-projection fitting structure M. That is, as illustrated in FIGS. 6A and 6B, the gap 58 is formed between the forged section 31 of the hub wheel 1 and the back surface 11a of the mouth section 11, and an inboard side foreign-matter intrusion prevention means W1 can be formed of a seal member 59 fitted and attached in the gap 58. In this case, the gap 58 is formed in a region ranging from between the forged section 31 of the hub wheel 1 and the back surface 11a of the mouth section 11 to between the larger diameter portion 46 and the shaft section 12. In this embodiment, the seal member 59 is arranged at a corner portion located between the forged section 31 of the hub wheel 1 and a larger diameter portion 12c. Note that, as the seal member 59, there may be used an O-ring or the like as illustrated in FIG. 6A, or a gasket or the like as illustrated in FIG. 6B.

An outboard side foreign-matter intrusion prevention means W2 can be formed of a seal material interposed between the inner wall 22c and a bearing surface 60a of the bolt member 54 of a screw structure M2 (screw structure formed of the bolt member 54 and the threaded hole 50) for fixing the hub wheel and the shaft section of the outer joint member to each other. Further, a seal material may be interposed between the fitting contact regions 38 of the projecting portions 35 and the recessed portions 36, thereby forming a foreign-matter intrusion prevention means W (W3).

Next, description is made of a fitting method for the recess-projection fitting structure M. In this case, as illustrated in FIG. 7, thermosetting treatment is effected on the radially outer portion of the shaft section 12 so as to form a spline 41 including projecting portions 41a and recessed portions 41b along the axial direction of a hardened layer H thus formed. Thus, the projecting portions 41a of the spline 41 are subjected to thermosetting treatment, with the result that the projecting portions 41a constitute the projecting portions 35 of the recess-projection fitting structure M. The spline 41 is provided on the smaller diameter portion side of the body portion 12a of the shaft section 12. Note that, as indicated by the cross-hatched region, a range of the hardened layer H in this embodiment extends from an outer edge of the spline 41 to a part of a bottom wall of the mouth section 11 of the outer race 5. As the thermosetting treatment, there may be adopted various kinds of thermal treatment such as induction quenching and carburizing and quenching. Incidentally, the induction quenching represents quenching which utilizes a principle of inserting a part which needs to be quenched into a coil through which a high-frequency current flows and heating a conductive object with Joule heat generated by electromagnetic induction. Further, the carburizing and quenching represents quenching performed after causing carbon to intrude into a low-carbon material through a surface thereof and to disperse. The spline 41 of the shaft section 12 has small teeth having module of 0.5 or smaller. Incidentally, the module is obtained by dividing a pitch circle diameter by the number of teeth.

The inner surface 37 (that is, inner surface of the shaft section fitting hole 22a) side of the hole portion 22 of the hub wheel 1 is an unhardened portion not subjected to the thermosetting treatment (in an unhardened state). A hardness difference between the hardened layer H of the shaft section 12 of the outer race 5 and the unhardened portion of the hub wheel 1 is set to be equal to or larger than 20 points in HRC. Further, specifically, the hardness of the hardened layer H is set within a range of from 50 HRC to 65 HRC, and the hardness of the unhardened portion is set within a range of from 10 HRC to 30 HRC.

In this case, middle portions in a projecting direction of the projecting portions 35 correspond to a position of a recessed-portion forming surface prior to formation of the recessed portions (in this case, inner surface 37 of the shaft section fitting hole 22a of the hole portion 22). That is, as illustrated in FIG. 7, an inner diameter dimension D of the inner surface 37 of the shaft section fitting hole 22a is set to be smaller than a maximum outer diameter of the projecting portions 35, i.e., a diameter dimension (circumscribed circle diameter) D1 of a circle connecting vertexes of the projecting portions 35 as the projecting portions 41a of the spline 41 and is set to be larger than a diameter dimension D2 of a circle connecting bottoms between the projecting portions 35 (bottoms of the recessed portions 41b of the spline 41). In other words, the dimensions are set in a relation of D2<D<D1. Thus, of the projecting portions 35 of the shaft section 12, at least portions ranging from the vertexes to the middle portions in the projecting direction are press-fitted to the inner surface 37 of the shaft section fitting hole 22a of the hub wheel 1. Further, the diameter dimension D1 is set to be smaller than a hole diameter dimension D3 of the larger diameter portion 46 of the hole portion 22.

The spline 41 can be formed by various machining methods such as rolling, cutting, pressing, and drawing, which are publicly known and used as conventional means. As the thermosetting treatment, various kinds of thermal treatment such as induction quenching and carburizing and quenching can be adopted. Note that, press-fitting start end surfaces 35a of the projecting portions 35 structured by formation of the spline 41 are formed into flat surfaces which are orthogonal to an axis direction of the shaft section 12.

Then, as illustrated in FIG. 7, the seal member 59 is externally fitted to the shaft section 12, and the shaft center of the hub wheel 1 and the shaft center of the outer race 5 of the constant velocity universal joint 3 are in an aligned state. In this state, the shaft section 12 of the outer race 5 is inserted (press-fitted) into the hub wheel 1. That is, the projecting portions 35 of the shaft section 12 are fitted to the guide recessed portions 44a of the shaft section press-fitting guide structure M1, respectively. With this, the shaft center of the hub wheel 1 and the shaft center of the outer race 5 are in a conformed state. In this case, end portions on the recess-projection fitting structure side of the guide recessed portions 44a are located on flat surfaces 77a (see FIG. 2) orthogonal to the press-fitting direction, and hence the end portions of the guide recessed portions 44a can receive the press-fitting start end surfaces 35a of the projecting portions 35. In this state, press-fitting can be started. Further, as described above, the diameter dimension D of the inner surface 37 of the shaft section fitting hole 22a, the diameter dimension D1 of the projecting portions 35, and the diameter dimension D2 of the recessed portions of the spline 41 are in the relation described above. Moreover, the hardness of the projecting portions 35 is larger than the hardness of the inner surface 37 by 20 points or more. Therefore, if the shaft section 12 is press-fitted into the hole portion 22 of the hub wheel 1, the projecting portions 35 bite in the inner surface 37, and the projecting portions 35 form the recessed portions 36, in which the projecting portions 35 fit, along the axial direction. Note that, at the time of the press-fitting, a seal material (sealing agent) made of a resin is applied on the surfaces of the projecting portions 35.

The press-fitting is continued until an end surface 52 of the smaller diameter portion 12b of the shaft section 12 comes into contact with an end surface 53 of the inner wall 22c. With this, as illustrated in FIGS. 3A and 3B, the projecting portions 35 on the end portion of the shaft section 12 and the recessed portions 36 fitting thereto are held in close contact with each other through the entire of the fitting contact regions 38. That is, the shape of the projecting portions 35 is transferred onto a recessed-portion forming surface on the counterpart side (inner surface 37 of the shaft section fitting hole 22a of the hole portion 22, in this case). In this case, the projecting portions 35 gradually bite into the inner surface 37 of the hole portion 22, and accordingly the hole portion 22 becomes slightly larger in diameter. As a result, the projecting portions 35 are allowed to move in the axial direction. When the movement thereof in the axial direction is stopped, the hole portion 22 is reduced in diameter for restoring the original diameter. In other words, the hub wheel 1 is elastically deformed in a radial direction at the time of press-fitting of the projecting portions 35. Precompression corresponding to the elastic deformation is applied to the tooth surface of the projecting portions 35 (surface of recessed-portion fitting region). Thus, it is possible to reliably form the recess-projection fitting structure M in which the entire of the recessed-portion fitting region of the projecting portions 35 is brought into close contact with the recessed portions 36 corresponding thereto. That is, with the spline (male spline) 41 on the shaft section 12 side, a female spline 42 brought into close contact with the male spline 41 is formed in the inner surface of the hole portion 22 of the hub wheel 1.

The recess-projection fitting structure M is formed in this manner. The recess-projection fitting structure M in this case is arranged at an immediate-underside avoiding position with respect to the raceway surfaces 26, 27, 28, and 29 of the roller bearing 2. Incidentally, the immediate-underside avoiding position represents a position of not radially corresponding to a position of a ball contact portion of each of the raceway surfaces 26, 27, 28, and 29.

After the press-fitting, a bolt member 54 is screwed into the threaded hole 50 of the shaft section 12 from the outboard side. In this case, a seal material (sealing agent) made of a resin is applied on the bearing surface 60a of the bolt member 54. Through screwing the bolt member 54 into the threaded hole 50 of the shaft section 12, a flange portion 60 of the head portion 54a of the bolt member 54 is fitted in the recessed portion 51 of the inner wall 22c. With this, the inner wall 22c is sandwiched by an end surface 52 on the outboard side of the shaft section 12 and the head portion 54a of the bolt member 54. In this way, the inner wall 22c constitutes a bearing surface for bolt-fixation of the constant velocity universal joint, and the hub wheel 1 and the shaft section 12 of the outer race 5 are fixed with the screw structure M2.

In this case, the seal member 59 such as an O-ring is externally fitted to the base portion (mouth section side) of the shaft section 12 of the outer race 5, and hence the gap 58 between the forged section 31 of the hub wheel 1 and the back surface 11a of the mouth section 11 is closed (sealed) with the seal member 59 in a state in which the press-fitting is completed. That is, it is possible to form the foreign-matter intrusion prevention means W (W1) located on the inboard side with respect to the recess-projection fitting structure M. Further, regions ranging from between the fitting contact regions 38 of the projecting portions 35 and the recessed portions 36 to the gaps 40 are sealed with the seal material applied on the surfaces of the projecting portions 35. That is, it is possible to form the foreign-matter intrusion prevention means W (W3) located between the fitting contact regions 38.

Further, the seal material (sealing agent) is applied on the bearing surface 60a of the bolt member 54. Thus, after being cured, the seal material can exert sealing performance between the bearing surface 60a of the bolt member 54 and a bottom surface of the recessed portion 51 of the inner wall 22c. With this, it is possible to form the foreign-matter intrusion prevention means W (W2) located on the outboard side with respect to the recess-projection fitting structure M. Note that, as the seal material constituting the foreign-matter intrusion prevention means W2 and as the foreign-matter intrusion prevention means W3, there is selected a material that does not deteriorate in the atmosphere in which the bearing device for a wheel is used.

Incidentally, when the shaft section 12 of the outer race 5 is press-fitted into the hole portion 22 of the hub wheel 1, as indicated by the imaginary line of FIG. 7, a press-fitting jig K may be engaged on a stepped surface G provided in the outer surface of the mouth section 11 of the outer race 5, whereby press-fitting load (axial load) is applied from the press-fitting jig K onto the stepped surface G. Note that, the stepped surface G may be provided in the entire circumference in the circumferential direction, or the stepped surfaces G may be provided at predetermined pitches along the circumferential direction. Therefore, as the press-fitting jig K, any jig may be used as long as the jig can apply the axial load correspondingly to the stepped surfaces G.

Thus, in the present invention, the entire fitting contact regions 38 of the projecting portions 35 of the shaft section 12 and the recessed portions 36 of the hub wheel 1 are brought into close contact with each other so as to reliably form the recess-projection fitting structure M. Moreover, it is unnecessary to form spline sections and the like on a member in which the recessed portions 36 are formed. The bearing device for a wheel is excellent in productivity. Further, phase alignment of the splines is unnecessary. It is possible to realize improvement of assembly property, prevent damages to the tooth surfaces during press-fitting, and maintain a stable fitting state.

In the recess-projection fitting structure M, the entire regions of the fitting contact regions 38 between the projecting portions 35 and the recessed portions 36 are held in close contact, and hence, in the recess-projection fitting structure M, a gap in which a backlash occurs is not formed in a radial direction and a circumferential direction. Thus, the entire fitting regions contribute to rotation torque transmission, and stable torque transmission is possible. In addition, abnormal noise is not generated.

The end portion of the hub wheel 1 is forged and precompression is applied on the roller bearing 2, and hence it is unnecessary to apply precompression to the inner race with the mouth section 11 of the outer race 5. Therefore, it is possible to press-fit the shaft section 12 of the outer race 5 without taking into account precompression applied to the inner race 24, and to realize improvement of connectability (assemblability) of the hub wheel 1 and the outer race 5. The mouth section 11 is out of contact with the hub wheel 1, and hence it is possible to prevent occurrence of abnormal noise due to contact between the mouth section 11 and the hub wheel 1.

On the inboard side with respect to the recess-projection fitting structure M, the gap 58 between the mouth section 11 of the outer race 5 and the forged section 31 formed by forging the end portion of the hub wheel 1 is sealed with the seal member 59, and hence it is possible to prevent rainwater and foreign matters from intruding through the gap 58, and to avoid deterioration of adhesiveness caused by the rainwater, foreign matters, etc. intruding into the recess-projection fitting structure M. Further, the seal material is interposed between the inner wall 22c and the bearing surface 60a of the bolt member 54 of the screw structure for fixing the hub wheel 1 and the shaft section 12 of the outer race 5 to each other, and hence it is possible to prevent rainwater and foreign matters from intruding into the recess-projection fitting structure M from the bolt member 54, and to achieve improvement in quality.

Moreover, the seal material is interposed between the fitting contact regions 38 of the projecting portions 35 and the recessed portions 36, and hence, in between the fitting contact regions 38, it is possible to prevent intrusion of foreign matters by the foreign-matter intrusion prevention means W3. Consequently, reliability in terms of preventing the intrusion of foreign matters is improved.

The shaft section press-fitting guide structure M1 is provided, and hence the shaft section 12 can be press-fitted into the hole portion 22 of the hub wheel 1 along the shaft section press-fitting guide structure M1.

Figure 5:
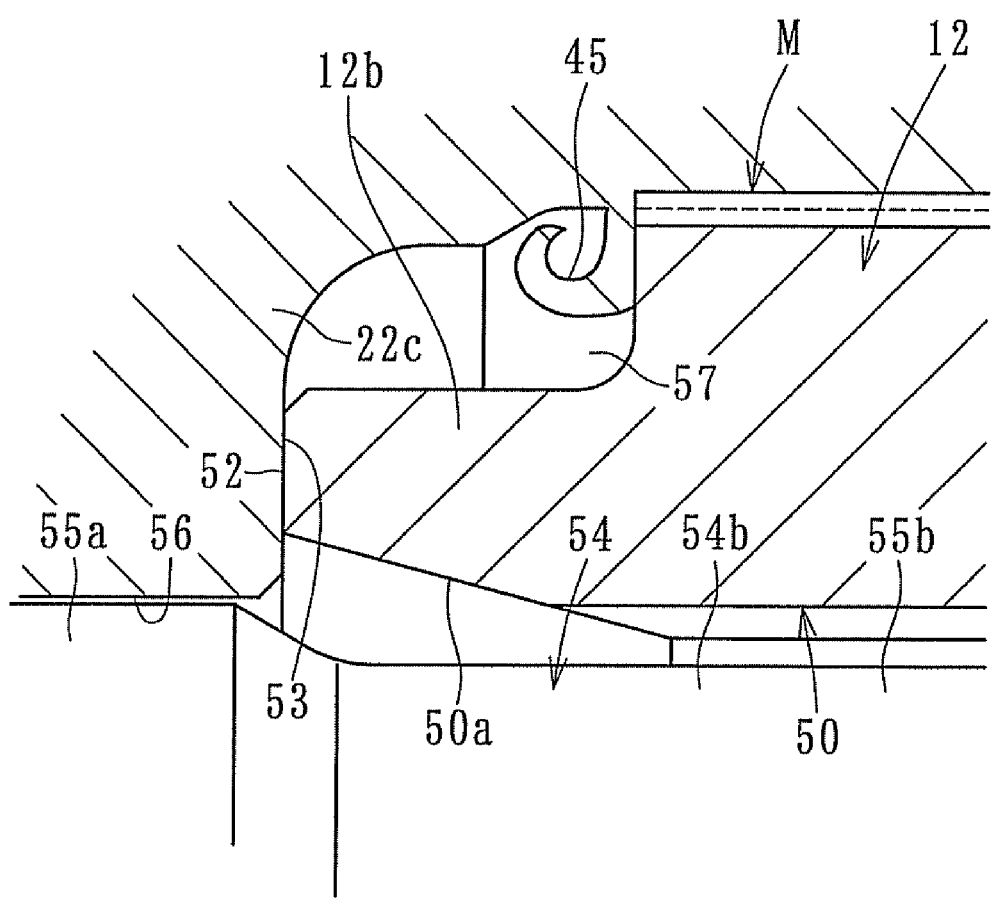
FIG. 5 An enlarged view of a main part of the bearing device for a wheel.

Incidentally, when the shaft section 12 is press-fitted into the hole portion 22 of the hub wheel 1, as illustrated in FIGS. 2 and 5, an extruded portion 45 to be formed is housed while curling in a housing section 57 corresponding to a space provided on the radially outer side of the smaller diameter portion 12b of the shaft section 12. In this case, the extruded portion 45 includes a part of material having a volume equal to that of the recessed portions 36 into (to) which the projecting portions 35 are fitted, the part including: a material forced out from the recessed portions 36 to be formed; a material trimmed for forming the recessed portions 36; a material forced out and trimmed; or the like. Thus, the extruded portion 45 including the part of the material chipped or forced out from the inner surface of the hole portion 22 gradually intrudes into the inside of the housing section 57.

By providing the housing section 57 for housing the extruded portion 45 generated by formation of the recessed portions caused by the press-fitting, it is possible to hold (maintain) the extruded portion 45 in the housing section 57. Therefore, the extruded portion 45 does not enter the inside of the vehicle and the like on the outside of the device. In other words, the extruded portion 45 can be kept housed in the housing section 57. It is unnecessary to perform removal processing for the extruded portion 45. Therefore, it is possible to realize a reduction in the number of worker-hours for assembly and realize improvement of assembly operability and cost reduction.

As a result of fixation with the screw structure M2, the shaft section 12 is regulated from slipping off from the hub wheel 1 in the axial direction after the press-fitting, and hence stable torque transmission is possible over a long period of time.

Further, the projecting portions 35 are arranged so as to position the middle portions in the projecting direction thereof on a recessed-portion forming surface prior to formation of the recessed portions. With this, the projecting portions 35 gradually bite into the recessed-portion forming surface at the time of press-fitting, and hence the recessed portions 36 can be reliably formed. That is, it is possible to sufficiently secure press-fitting allowance of the projecting portions 35 with respect to the counterpart side. With this, the following can be achieved: stabilization of moldability of the recess-projection fitting structure M, reduction of nonuniformity in press-fitting load, and stable torsional strength.

In the embodiment illustrated, for example, in FIG. 1, the projecting portions 35 of the recess-projection fitting structure M are provided on the shaft section 12 of the outer race 5, the hardness of the axial end portions of the projecting portions 35 is set to be higher than that of a radially inner portion of the hole portion of the hub wheel 1, and the shaft section 12 is press-fitted into the hole portion 22 of the hub wheel 1. With this, it is possible to increase the hardness on the shaft section side, and possible to increase the rigidity of the shaft section.

In particular, a hardness difference between the projecting portion side and the recessed portion forming side (in this case, side of the inner surface 37 of the hole portion 22 of the hub wheel 1) is set to be equal to or larger than 20 points in HRC. Thus, when the projecting portions 35 are press-fitted into the counterpart side, it is possible to perform press-fitting only by applying a relatively small press-fitting force (press-fitting load), and to improve a press-fitting property. Further, it is unnecessary to apply large press-fitting load, and hence it is possible to prevent recessed and projected teeth to be formed from being damaged (torn off), and to stably configure the recess-projection fitting structure without the gap in which a backlash occurs in the radial direction and the circumferential direction.

By arranging the recess-projection fitting structure M at the immediate-underside avoiding position with respect to the raceway surfaces of the roller bearing 2, hoop stress on the raceway surfaces of the bearing is suppressed. With this, it is possible to prevent occurrence of failures with a bearing, such as reduction of rolling fatigue life, occurrence of cracks, and stress corrosion crack, and hence possible to provide the bearing 2 of high quality.

As described above in the embodiment, the spline 41 formed on the shaft section 12 has small teeth having module of 0.5 or smaller. Thus, it is possible to improve moldability of the spline 41 and to reduce press-fitting load. Note that, it is possible to constitute the projecting portions 35 by the spline normally formed on the shaft of this type, and hence possible to easily form the projecting portions 35 at low cost.

Incidentally, when the bolt member 54 is detached by being screwed backward from the state illustrated in FIG. 1, the outer race 5 can be pulled out from the hub wheel 1. That is, a fitting force of the recess-projection fitting structure M is set to an extent that the hub wheel 1 can be pulled out by applying a pulling-out force larger than a predetermined force to the outer race 5.

For example, the hub wheel 1 and the constant velocity universal joint 3 can be separated from each other with a jig 70 illustrated in FIG. 8. The jig 70 includes a base 71, a pressing bolt member 73 threadedly engaged with a threaded hole 72 of the base 71 so as to be screwed forward/backward, and a screw shaft 76 threadedly engaged with the threaded hole 50 of the shaft section 12. A through-hole 74 is provided in the base 71, and a bolt 33 of the hub wheel 1 is inserted into the through-hole 74 so that a nut member 75 is threadedly engaged with the bolt 33. In this case, the base 71 and the flange 21 of the hub wheel 1 are superimposed on each other, and the base 71 is attached to the hub wheel 1.

After the attachment of the base 71 to the hub wheel 1 in this manner or before the attachment of the base 71 thereto, a screw shaft 76 is threadedly engaged with the threaded hole 50 of the shaft section 12 so as to protrude a proximal portion 76a from the inner wall 22c to the outboard side. A projecting amount of the proximal portion 76a is set to be larger than the axial length of the recess-projection fitting structure M. The screw shaft 76 and the pressing bolt member 73 are arranged coaxially with each other (coaxially with the bearing device for a wheel).

After that, as illustrated in FIG. 8, the pressing bolt member 73 is screwed into the threaded hole 72 of the base 71 from the outboard side, and in this state, is screwed forward to the screw shaft 76 as indicated by the arrow. In this case, the screw shaft 76 and the pressing bolt member 73 are arranged coaxially with each other (coaxially with the bearing device for a wheel), and hence the pressing bolt member 73 presses the screw shaft 76 in the arrow direction as a result of the forward screwing. With this, the outer race 5 is moved in the arrow direction with respect to the hub wheel 1, and the outer race 5 is detached from the hub wheel 1.

Figure 10A:
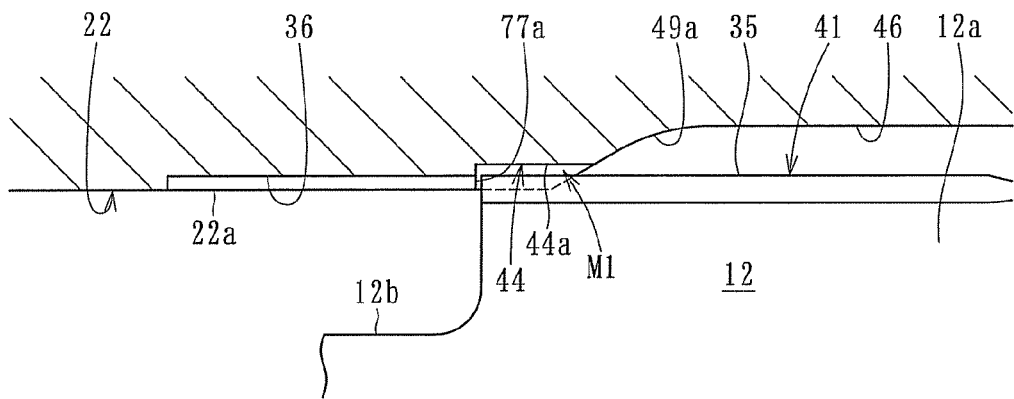
FIG. 10A A sectional view illustrating a state just before press-fitting is performed by the re-press-fitting method.

Further, in the state in which the outer race 5 is detached from the hub wheel 1, the hub wheel 1 and the outer race 5 can be re-coupled with each other with use of, for example, the bolt member 54. In other words, the base 71 is detached from the hub wheel 1, and the screw shaft 76 is detached from the shaft section 12. In this state, as illustrated in FIG. 10A, the projecting portions 35 of the shaft section 12 are fitted into the guide recessed portions 44a. With this, the male spline 41 on the shaft section 12 side and a female spline 42 of the hub wheel 1 are aligned in phase with each other, the female spline 42 being formed by previous press-fitting. In this case, as illustrated in FIG. 4A, the radial gaps C1 are formed between the vertexes of the projecting portions 35 and the bottoms of the guide recessed portions 44a.

Figure 9:
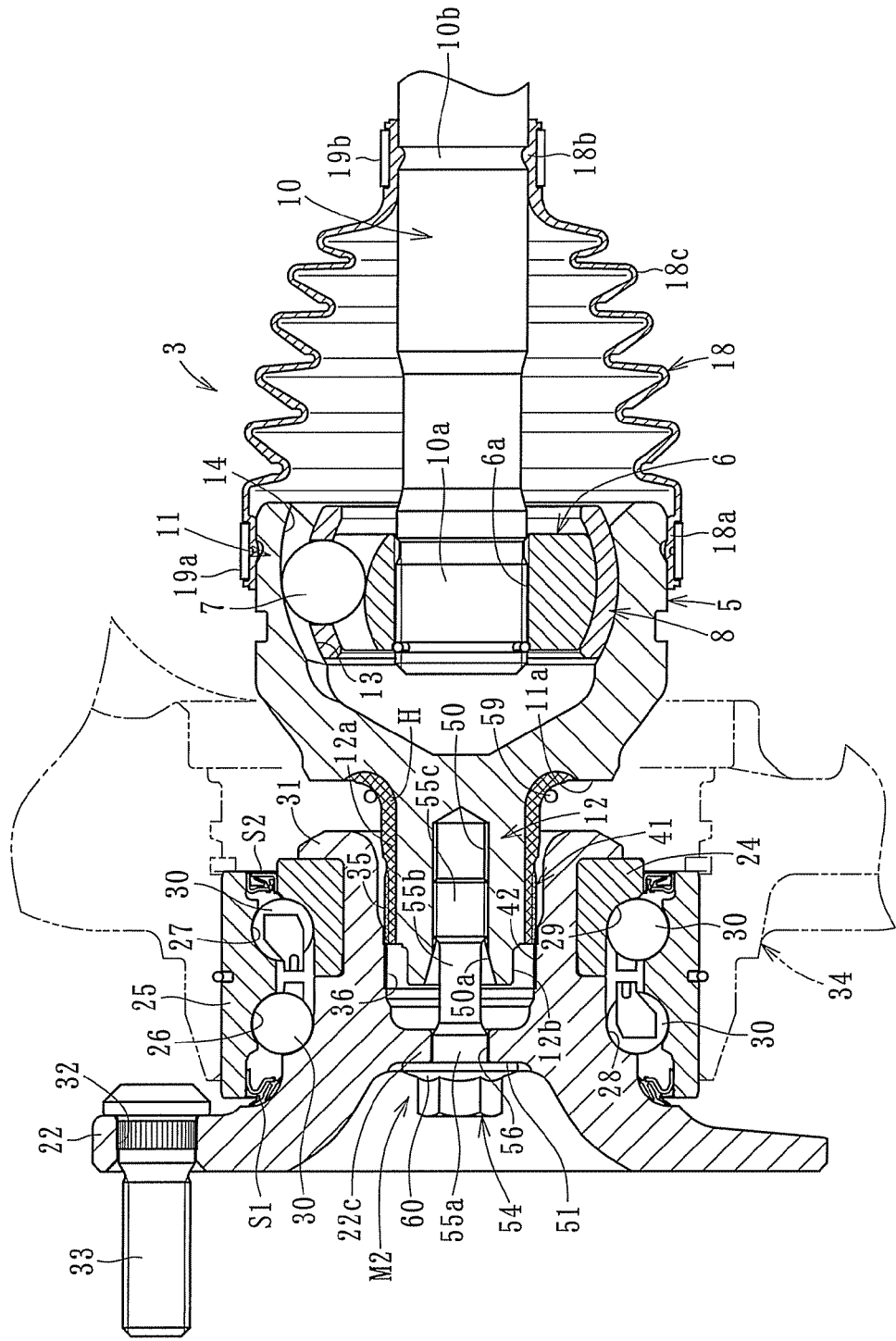
FIG. 9 A sectional view illustrating a re-press-fitting method.
Figure 10B:
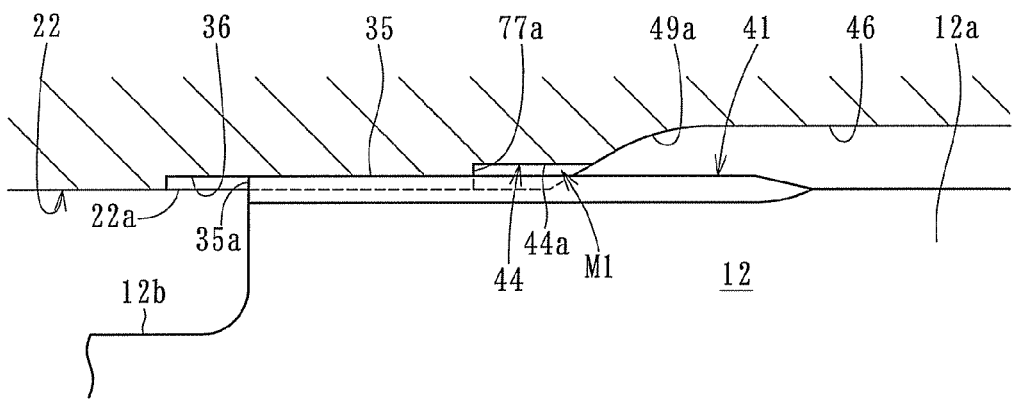
FIG. 10B A sectional view illustrating a state while press-fitting is performed by the re-press-fitting method.
Figure 10C:
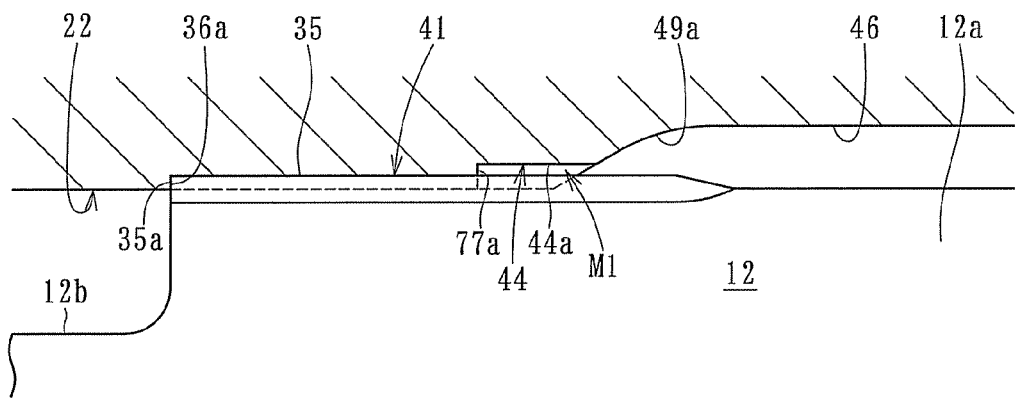
FIG. 10C A sectional view illustrating a state after press-fitting is completed by the re-press-fitting method.

In this state, as illustrated in FIG. 9, the bolt member 54 is threadedly engaged with the threaded hole 50 of the shaft section 12 through the through-hole 56, and the bolt member 54 is screwed forward with respect to the threaded hole 50 (forward screwing of the screw structure M2). With this, as illustrated in FIG. 10B, the shaft section 12 is gradually fitted into the hub wheel 1. In this case, the hole portion 22 becomes slightly larger in diameter so as to allow the shaft section 12 to move in the axial direction. The shaft section 12 moves until the end surface 52 of the smaller diameter portion 12b of the shaft section 12 comes into contact with the end surface 53 of the inner wall 22c. In this case, as illustrated in FIG. 10C, the end surfaces 35a of the projecting portions 35 come into contact with end surfaces 36a of the recessed portions 36. When the movement of the shaft section in the axial direction is stopped, the hole portion 22 is reduced in diameter by restoring the original diameter. With this, similarly to the previous press-fitting, it is possible to reliably form the recess-projection fitting structure M in which the entire of the recessed-portion fitting regions of the projecting portions 35 is held in close contact with the recessed portions 36 corresponding thereto.

Note that, the opening portion of the threaded hole 50 of the shaft section 12 is formed as the tapered portion 50a opening in an enlarged manner toward the opening. Thus, there is an advantage that the screw shaft 76 and the bolt member 54 are easily and threadedly engaged with the threaded hole 50.

Incidentally, at the time of first press-fitting (press-fitting for molding the recessed portions 36 in the inner surface 37 of the hole portion 22), press-fitting load is relatively large. Thus, it is necessary to use a press machine or the like for the press-fitting. In contrast, at the time of the re-press-fitting, press-fitting load is smaller than the press-fitting load at the time of the first press-fitting. Thus, without use of a press machine or the like, it is possible to stably and accurately press-fit the shaft section 12 into the hole portion 22 of the hub wheel 1. Thus, the outer race 5 and the hub wheel 1 can be separated and coupled with respect to each other on site.

As described above, the outer race 5 can be detached from the hole portion 22 of the hub wheel 1 by application of the pulling-out force in the axial direction to the shaft section 12 of the outer race 5. Thus, it is possible to improve operability in repair and inspection of the components (maintenance property). In addition, by re-press-fitting the shaft section 12 of the outer race 5 into the hole portion 22 of the hub wheel 1 after the repair and inspection of the components, it is possible to form the recess-projection fitting structure M in which the projecting portions 35 and the recessed portions 36 are held in close contact with each other through the entire region of the fitting contact regions 38. Thus, it is possible to re-structure a bearing device for a wheel capable of performing stable torque transmission.

The shaft section press-fitting guide structure M1 includes the guide recessed portions 44a for aligning the projecting portions 35 as one side and the recessed portions 36 as the other side in phase with each other. Thus, when the shaft section 12 of the outer joint member is re-press-fitted into the hole portion 22 of the hub wheel 1, the shaft section 12 is fitted into the recessed portions 36 formed by the previous press-fitting, and does not damage the recessed portions 36. Therefore, it is possible to re-configure with high accuracy the recess-projection fitting structure M without the gap in which a backlash occurs in the radial direction and the circumferential direction.

The gaps are formed, for example, between the vertexes of the projecting portions 35 and the bottoms of the guide recessed portions 44a, and thus the projecting portions 35 can be easily fitted into the guide recessed portions 44a in a step prior to press-fitting. In addition, the guide recessed portions 44a do not inhibit press-fitting of the projecting portions 35. Therefore, it is possible to realize improvement of assembly property.

When the bolt member 54 is screwed forward with respect to the threaded hole 50, the proximal portion 55a of the bolt member 54 corresponds to the through-hole 56 as illustrated in FIG. 7. In addition, the hole diameter d1 of the through-hole 56 is set to be slightly larger than the outer diameter d2 of the larger-diameter proximal portion 55a of the screw shaft portion 54b. (Specifically, the diameters are set within a range of 0.05 mm<d1-d2<0.5 mm.) Thus, with use of the outer diameter of the proximal portion 55a of the bolt member 54 and the inner diameter of the through-hole 56, it is possible to form a guide along which the bolt member 54 is screwed forward into the threaded hole 50, and hence possible to press-fit the shaft section 12 into the hole portion 22 of the hub wheel 1 without causing decentering. Note that, when the axial length of the through-hole 56 is excessively short, stable guiding cannot be effected, and in contrast, when the axial length of the through-hole 56 is excessively long, the axial length of the recess-projection fitting structure M cannot be secured and the weight of the hub wheel 1 is increased due to an increase in thickness dimension of the inner wall 22c. Thus, various modifications may be made in consideration of those factors.

Figure 4B:
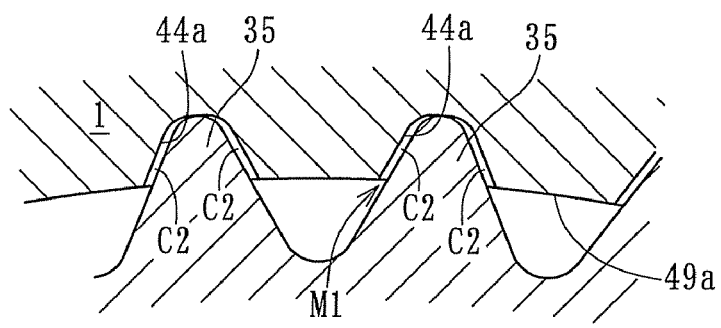
FIG. 4B An enlarged sectional view of a first modification of the shaft section press-fitting guide structure.
Figure 4C:
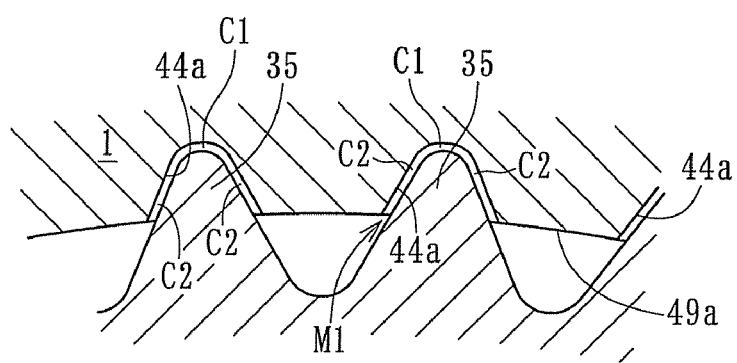
FIG. 4C An enlarged sectional view of a second modification of the shaft section press-fitting guide structure.

In the above-mentioned embodiment, as illustrated in FIG. 4A, the radial gaps C1 are formed between the vertexes of the projecting portions 35 and the bottoms of the guide recessed portions 44a. However, as illustrated in FIG. 4B, circumferential gaps C2 and C2 may be formed between side portions of the projecting portions 35 and side portions of the guide recessed portions 44a. Further, as illustrated in FIG. 4C, the radial gaps C1 may be formed between the vertexes of the projecting portions 35 and the bottoms of the guide recessed portions 44a, and the circumferential gaps C2 may be formed between the side portions of the projecting portions 35 and the side portions of the guide recessed portions 44a. Owing to formation of the gaps as described above, the projecting portions 35 can be easily fitted into the guide recessed portions 44a in a step prior to press-fitting, and the guide recessed portions 44a do not inhibit press-fitting of the projecting portions 35.

In the spline 41 illustrated in FIG. 3, a pitch of the projecting portions 41a and a pitch of the recessed portions 41b are set to be equal to each other. Thus, as described above in the embodiment, as illustrated in FIG. 3B, a circumferential thickness L of the middle portions in the projecting direction of the projecting portions 35, and a circumferential dimension L0 in a position corresponding to the middle portions between the projecting portions 35 adjacent to each other in the circumferential direction are substantially equal to each other.

Figure 11A:
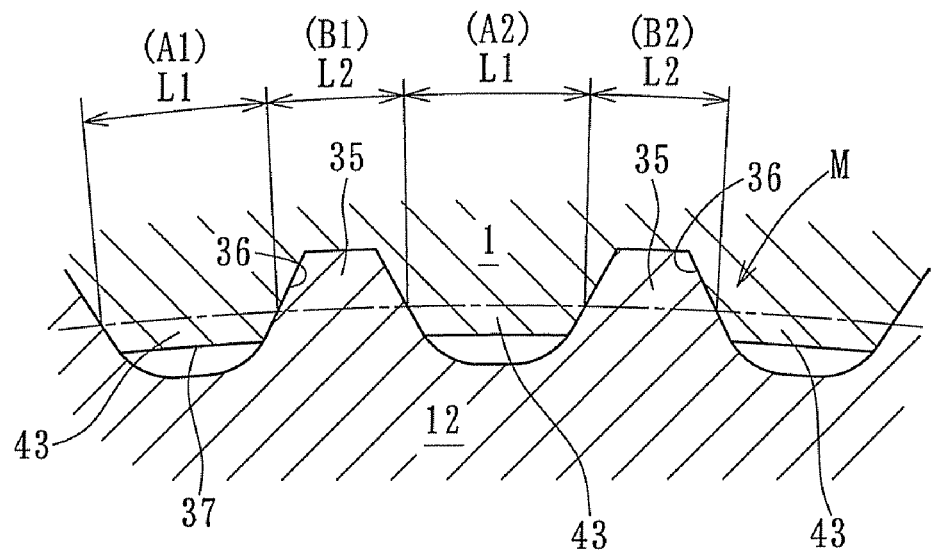
FIG. 11A A sectional view of a modification of the recess-projection fitting structure.

Meanwhile, as illustrated in FIG. 11A, a circumferential thickness L2 of the middle portions in the projecting direction of the projecting portions 35 may be smaller than a circumferential dimension L1 in a position corresponding to the middle portions between the projecting portions 35 adjacent to each other in the circumferential direction. That is, in the spline 41 formed on the shaft section 12, the circumferential thickness (tooth thickness) L2 of the middle portions in the projecting direction of the projecting portions 35 is set to be smaller than the circumferential thickness (tooth thickness) L1 of middle portions in a projecting direction of projecting portions 43 on the hub wheel 1 side, the projecting portions 43 fitting in between the projecting portions 35.

Therefore, a sum $\Sigma(B1+B2+B3+\ldots)$ of tooth thicknesses of the projecting portions 35 in the entire circumference on the shaft section 12 side is set to be smaller than a sum $\Sigma(A1+A2+A3+\ldots)$ of tooth thicknesses of the projecting portions 43 (projecting teeth) on the hub wheel 1 side. With this, it is possible to increase a shearing area of the projecting portions 43 on the hub wheel 1 side and to secure torsional strength. In addition, the tooth thickness of the projecting portions 35 is small, and hence it is possible to reduce press-fitting load and to achieve improvement of press-fitting property. When a sum of circumferential thicknesses of the projecting portions 35 is set to be smaller than a sum of circumferential thicknesses of the projecting portions 43 on the counterpart side, it is unnecessary to set the circumferential thickness L2 of all the projecting portions 35 to be smaller than the circumferential dimension L1 between the projecting portions 35 adjacent to each other in the circumferential direction. That is, even when a circumferential thickness of arbitrary projecting portions 35 among the plurality of projecting portions 35 is equal to or larger than a dimension in the circumferential direction between the projecting portions adjacent to each other in the circumferential direction, a sum of circumferential thicknesses only has to be smaller than a sum of dimensions in the circumferential direction.

Figure 11B:
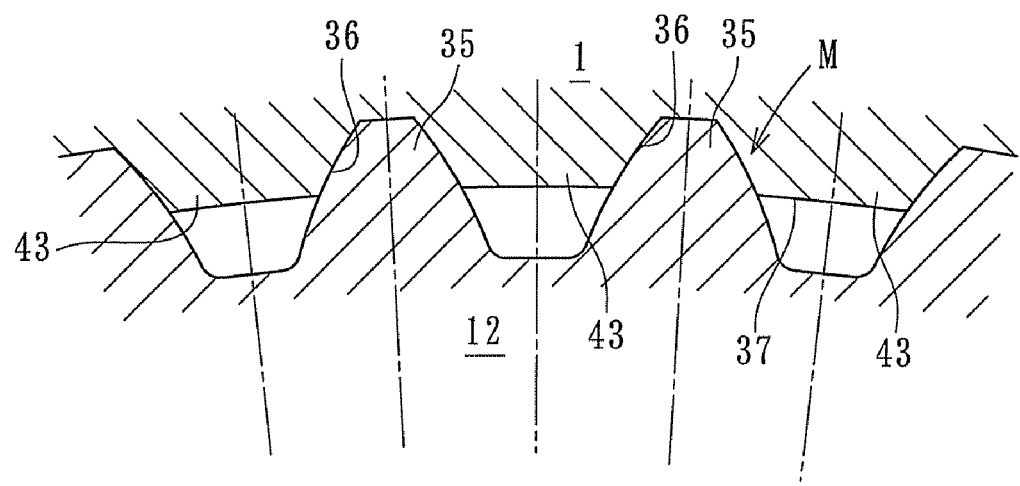
FIG. 11B A sectional view of a modification of the recess-projection fitting structure.

Note that, the projecting portions 35 illustrated in FIG. 11A have a trapezoidal shape in cross-section. However, a shape of the projecting portions 35 may be an involute tooth shape as illustrated in FIG. 11B.

Figure 12A:
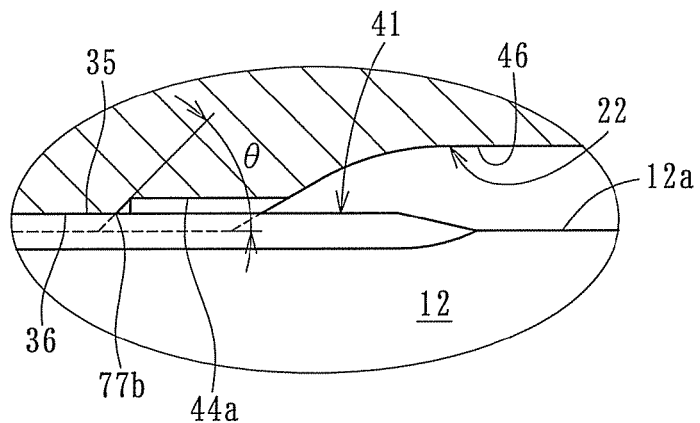
FIG. 12A A sectional view of a first modification of the shaft section press-fitting guide structure.

As the shaft section press-fitting guide structure M1, one illustrated in FIG. 12 may be used. In FIG. 12A, the end portions on the recess-projection fitting structure M side of the guide recessed portions 44a are formed into inclined surfaces 77b which are inclined and reduced in diameter along the press-fitting direction (press-fitting progressing direction). That is, an inclination angle θ of the inclined surfaces 77b is set to about 45°, for example.

Figure 12B:
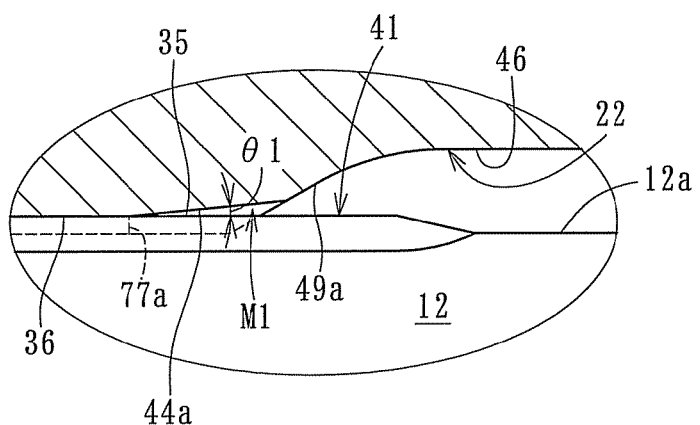
FIG. 12B A sectional view of a second modification of the shaft section press-fitting guide structure.
Figure 12C:
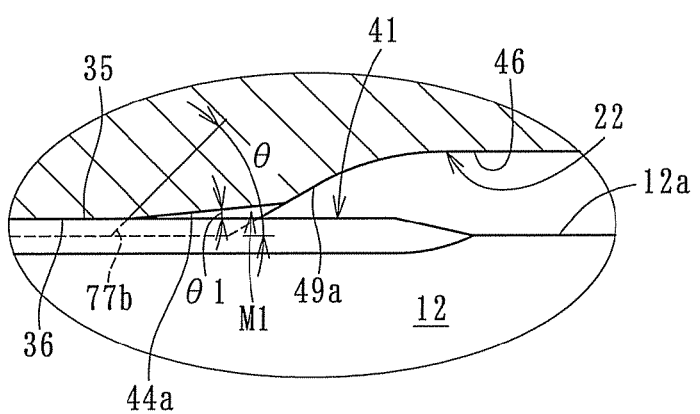
FIG. 12C A sectional view of a third modification of the shaft section press-fitting guide structure.

In FIGS. 12B and 12C, a radial depth dimension of the guide recessed portions 44a is reduced in diameter in the press-fitting direction. Further, in FIG. 12B, the end portions on the recess-projection fitting structure M side are formed into the flat surfaces 77a orthogonal to the press-fitting direction. In FIG. 12C, the end portions on the recess-projection fitting structure M side are formed into the inclined surfaces 77b which are inclined and reduced in diameter along the press-fitting direction (press-fitting progressing direction). An inclination angle θ1 of the inclined surfaces 77b is set to about 5°, for example.

In a case where the end portions on the recess-projection fitting structure side of the guide recessed portions 44a are formed into the flat surfaces 77a orthogonal to the press-fitting direction, it is possible to receive the shaft section 12 by the flat surfaces 77a when the shaft section 12 is press-fitted into the hole portion 22. Further, in a case of being formed into the inclined surfaces 77b, it is possible to stably fit the projecting portions 35 into the recessed portions 36 as the counterpart side from the guide recessed portions 44a. Also when the radial depth of the guide recessed portions 44a is reduced in diameter in the press-fitting direction, it is possible to stably fit the projecting portions 35 into the recessed portions 36 as the counterpart side from the guide recessed portions 44a.

Figure 13:
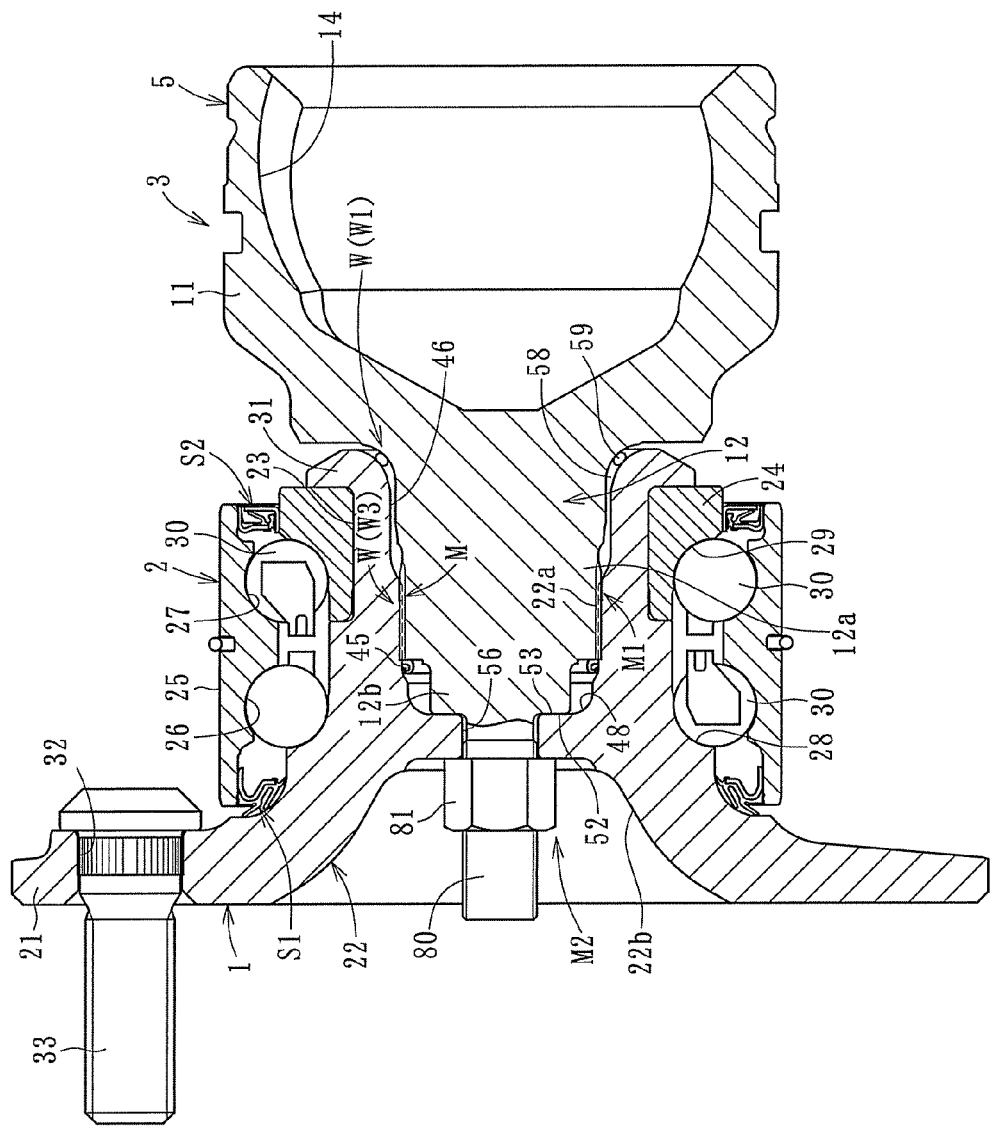
FIG. 13 A sectional view of a bearing device for a wheel according to a second embodiment of the present invention.

Further, as the screw structure M2, one according to a second embodiment illustrated in FIG. 13 may be used. That is, without providing a threaded hole in the shaft section 12, a screw shaft 80 is provided to protrude from the end surface 52 of the body portion 12a, and a nut member 81 is threadedly engaged with the screw shaft 80.

In this case, after the recess-projection fitting structure M is formed through press-fitting the shaft section 12 into the hole portion 22 of the hub wheel 1, the nut member 81 is threadedly engaged with the screw shaft 80 protruding toward the tapered hole 22b through the through-hole 56 of the inner wall 22c. In this state, in the illustrated example, the end surface 52 of the body portion 12a is held in contact with the end surface 53 of the inner wall 22c. In contrast, other than the above-mentioned contact, the end surface of the constant velocity universal joint, i.e., the back surface 11a of the mouth section 11, and the forged section (orbital formed section) 31 of the hub wheel 1 are sometimes held in contact with each other.

Further, also in the bearing device for a wheel illustrated in FIG. 13, the shaft section 12 can be detached from the hub wheel 1 through detaching the nut member 81 from the screw shaft 80. In this case, for example, a pulling-out force can be applied through the end surface of the screw shaft 80, etc.

In the state in which the outer race 5 is detached from the hub wheel 1, the hub wheel 1 and the outer race 5 can be re-coupled with each other with use of, for example, the nut member 81. That is, as illustrated in FIG. 10A, the projecting portions 35 of the shaft section 12 are fitted into the guide recessed portions 44a. With this, the male spline 41 on the shaft section 12 side and the female spline 42 of the hub wheel 1 are aligned in phase with each other, the female spline 42 being formed by previous press-fitting. In this case, as illustrated in FIG. 4A and the like, the radial gaps C1 are formed between the vertexes of the projecting portions 35 and the bottoms of the guide recessed portions 44a.

In this state, the nut member 81 is threadedly engaged with the screw shaft 80, and the nut member 81 is screwed forward with respect to the screw (forward screwing of the screw structure M2). With this, as illustrated in FIG. 10B, the shaft section 12 is gradually fitted into the hub wheel 1. Finally, as illustrated in FIG. 10C, the end surfaces 35a of the projecting portions 35 come into contact with the end surfaces 36a of the recessed portions 36. With this, similarly to the previous press-fitting, it is possible to reliably form the recess-projection fitting structure M in which the entire of the recessed-portion fitting regions of the projecting portions 35 is held in close contact with the recessed portions 36 corresponding thereto.

Figure 14A:
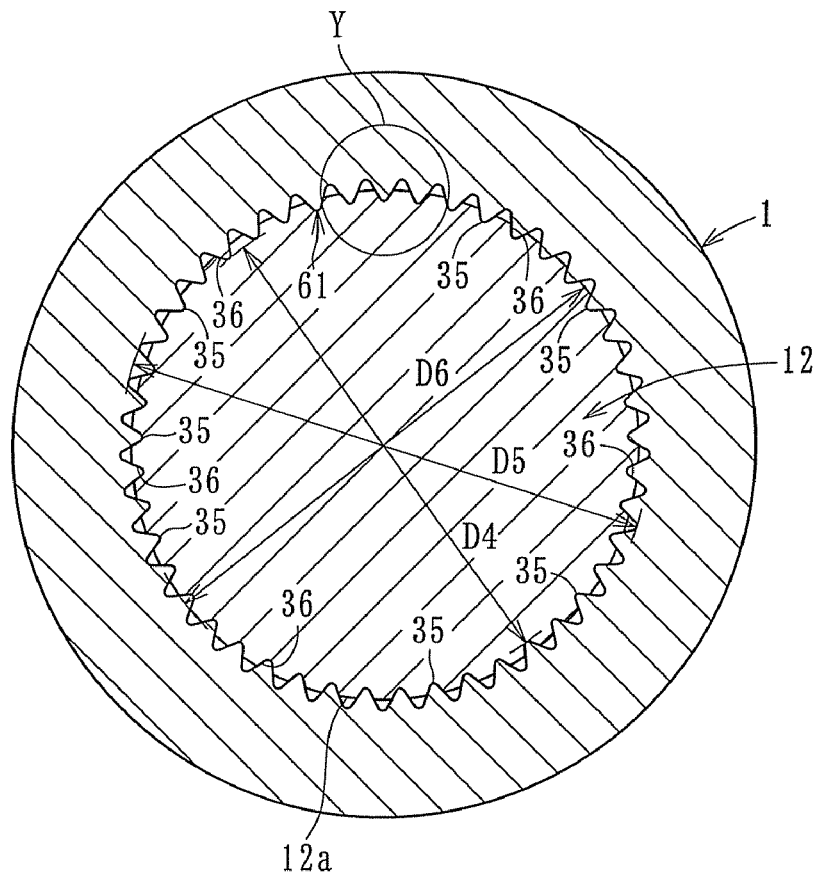
FIG. 14A A lateral sectional view of a bearing device for a wheel according to a third embodiment of the present invention.

Incidentally, in the embodiments, the spline 41 constituting the projecting portions 35 is formed on the shaft section 12 side. Hardening treatment is performed on the spline 41 of the shaft section 12 and the inner surface of the hub wheel 1 is not hardened (raw material). Meanwhile, as illustrated in FIG. 14 of a third embodiment, a spline 61 (including projected streaks 61a and recessed streaks 61b) subjected to hardening treatment may be formed on the inner surface of the hole portion 22 of the hub wheel 1, and hardening treatment may not be performed on the shaft section 12. Note that, the spline 61 can also be formed by various machining methods such as broaching, cutting, pressing, and drawing, which are publicly known and used as conventional means. Further, as the thermosetting treatment, various kinds of thermal treatment such as induction quenching and carburizing and quenching can be adopted.

In this case, the middle portions in the projecting direction of the projecting portions 35 correspond to the position of the recessed-portion forming surface (outer surface of the shaft section 12) prior to formation of the recessed portions. That is, a diameter dimension (minimum diameter dimension of the projecting portions 35) D4 of a circle connecting vertexes of the projecting portions 35 as the projecting portions 61a of the spline 61 is set to be smaller than an outer diameter dimension D6 of the shaft section 12. A diameter dimension (inner diameter dimension of the inner surface of the fitting hole between the projecting portions) D5 of a circle connecting bottoms of the recessed portions 61b of the spline 61 is set to be larger than the outer diameter dimension D6 of the shaft section 12. In other words, the dimensions are set in a relation of D4<D6<D5. Thus, of the projecting portions 35 of the hole portion 22, at least portions ranging from the vertexes to the middle portions in the projecting direction are press-fitted to the outer surface of the shaft section 12.

When the shaft section 12 is press-fitted into the hole portion 22 of the hub wheel 1, by the projecting portions 35 on the hub wheel 1 side, the recessed portions 36, in which the projecting portions 35 fit, can be formed in the outer circumferential surface of the shaft section 12. Thus, the entire fitting contact regions 38 between the projecting portions 35 and the recessed portions that fit on the projecting portions 35 are brought into close contact with each other.

Figure 14B:
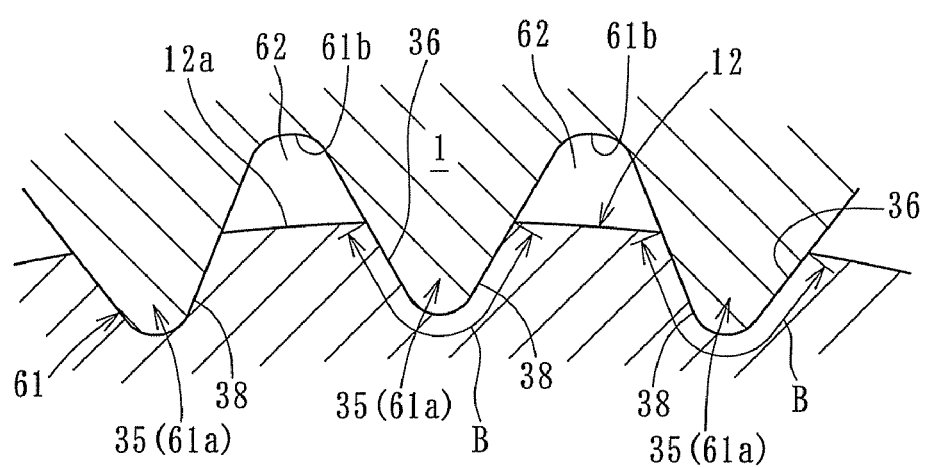
FIG. 14B An enlarged view of the Y section illustrated in FIG. 14A.
Figure 15:
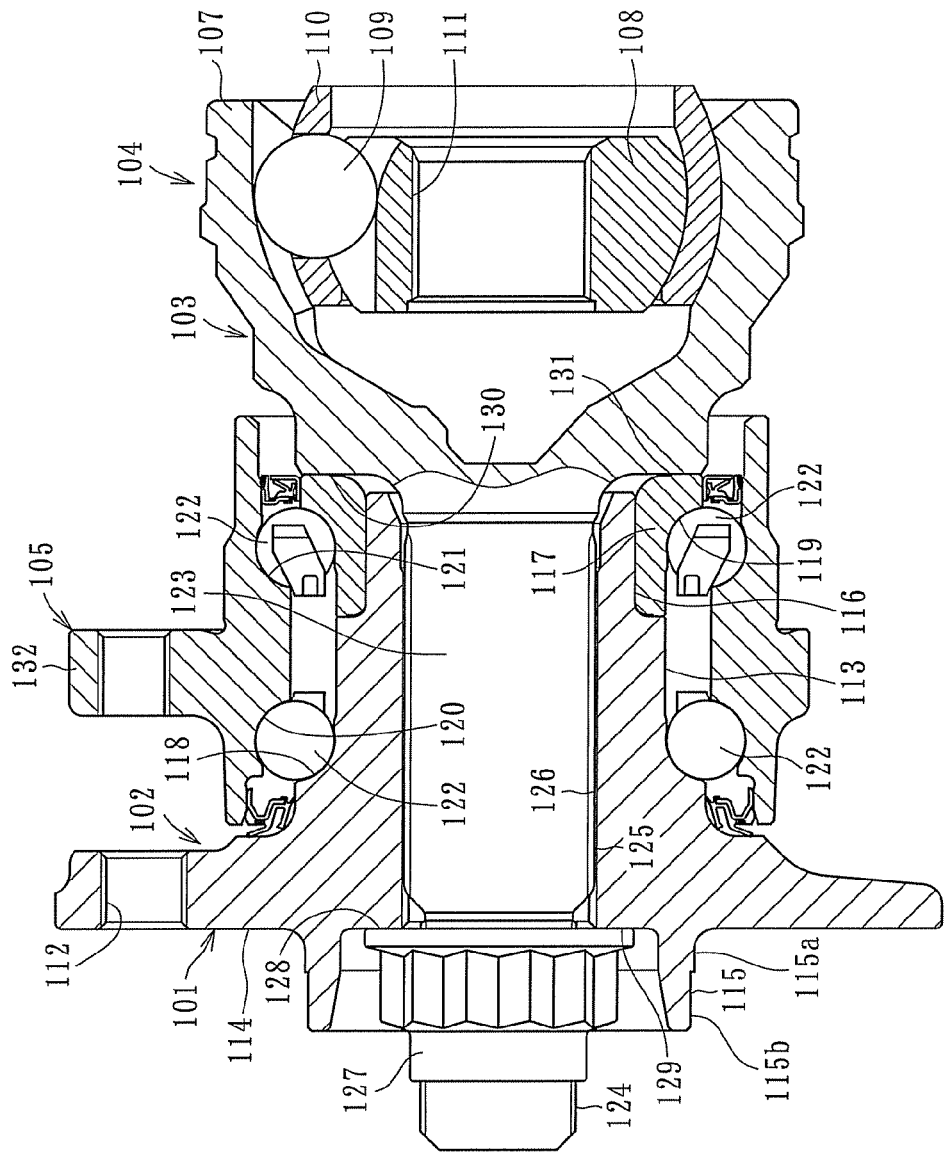
FIG. 15 A sectional view of a conventional bearing device for a wheel.

Here, the fitting contact regions 38 are illustrated as ranges B in FIG. 14B, the ranges extending from a midslope portion to a summit of the ridge shape in cross-section of the projecting portions 35. Further, a gap 62 is formed on the outer surface side with respect to the outer circumferential surface of the shaft section 12 between the projecting portions 35 adjacent to each other in the circumferential direction.

Also in the embodiment illustrated in FIG. 14, it is preferred to provide the shaft section press-fitting guide structure M1. In this case, the guide recessed portions 44a may be provided on the shaft section 12 side. Further, as illustrated in FIG. 4, the radial gaps C1 may be formed between the vertexes of the projecting portions 35 and the bottoms of the guide recessed portions 44a, or the circumferential gaps C2 and C2 may be formed between the side portions of the projecting portions 35 and the side portions of the guide recessed portions 44a. Moreover, the radial gaps C1 and the circumferential gaps C2 and C2 may be formed.

Even in the case illustrated in FIG. 14, the extruded portion 45 is formed by press-fitting. Therefore, it is preferred to provide the housing section 57 that houses the extruded portion 45. The extruded portion 45 is formed on the mouth section side of the shaft section 12, and hence the housing section is provided on the hub wheel 1 side.

In the above description, the projecting portions 35 of the recess-projection fitting structure M are provided on the inner surface 37 of the hole portion 22 of the hub wheel 1, and the hardness of the axial end portions of the projecting portions 35 is set to be higher than that of the radially outer portion of the shaft section 12 of the outer race 5, and press-fitting is performed. With this, it is unnecessary to perform hardness treatment (thermal treatment) on the shaft section side, and hence the outer joint member (outer race 5) of the constant velocity universal joint is excellent in productivity.

In the above description, the embodiments of the present invention are described. However, the present invention is not limited to the embodiments and various modifications of the embodiments are possible. For example, the shape of the projecting portions 35 of the recess-projection fitting structure M is a triangular shape in cross-section in the embodiment illustrated in FIG. 3 and is a trapezoidal shape in cross-section in the embodiment illustrated in FIG. 11A. Besides, projecting portions of various shapes such as a semicircular shape, a semi-elliptical shape, and a rectangular shape can be adopted. An area, the number, and a circumferential arrangement pitch, and the like of the projecting portions 35 can also be arbitrarily changed. In other words, it is unnecessary to form the spline 41 and form the projecting portions (projected teeth) 41a of this spline 41 as the projecting portions 35 of the recess-projection fitting structure M. The projecting portions 35 may be something like keys or may form wavy mating surfaces of a curved line shape. In short, it is sufficient that the projecting portions 35 arranged along the axial direction are press-fitted into the counterpart side, the recessed portions 36 held in close contact with the projecting portions 35 in a fitting manner can be formed on the counterpart side by the projecting portions 35, the entire fitting contact regions 38 of the projecting portions 35 and the recessed portions that fit on the projecting portions 35 are brought into close contact with each other, and rotation torque can be transmitted between the hub wheel 1 and the constant velocity universal joint 3.

The hole portion 22 of the hub wheel 1 may be a deformed-shape hole such as a polygonal hole other than a circular hole. A sectional shape of the end portion of the shaft section 12 inserted in a fitting manner into the hole portion 22 may be a deformed-shape section such as a polygon section other than a circular section. Moreover, when the shaft section 12 is press-fitted into the hub wheel 1, it is sufficient that only press-fitting start end portions of the projecting portions 35 have hardness higher than that of the regions where the recessed portions 36 are formed. Therefore, it is unnecessary to set the hardness of the entire projecting portions 35 to be high. In FIG. 3 and the like, the gap 40 is formed. However, the projecting portions 35 may bite in the inner surface 37 of the hub wheel 1 up to the recessed portions among the projecting portions 35. Note that, as a hardness difference between the projecting portions 35 side and the side of the recessed-portion forming surface formed by the projecting portions 35, it is preferred to set the hardness difference to be equal to or larger than 20 points in HRC. As long as the projecting portions 35 can be press-fitted, however, the hardness difference may be smaller than 20 points.

The end surfaces (press-fitting start ends) of the projecting portions 35 are the surfaces orthogonal to the axial direction in the embodiments. However, the end surfaces may be inclined at a predetermined angle with respect to the axial direction. In this case, the end surfaces may be inclined to the opposite projecting portion side from the radially inner side to the radially outer side or may be inclined to the projecting portion side.

In addition, in the inner surface 37 of the hole portion 22 of the hub wheel 1, there may be provided small recessed portions arranged at predetermined pitches along the circumferential direction. The small recessed portions need to have a volume smaller than that of the recessed portions 36. By providing the small recessed portions as described above, it is possible to achieve improvement of the press-fitting property of the projecting portions 35. That is, by providing the small recessed portions, it is possible to reduce the volume of the extruded portion 45 formed during press-fitting of the projecting portions 35, and to achieve reduction in press-fitting resistance. Further, it is possible to reduce the size of the extruded portion 45, and hence to reduce the volume of the housing section 57, and to realize improvement of processability of the housing section 57 and strength of the shaft section 12. Note that, the small recessed portions may have various shapes such as a semi-elliptical shape and a rectangular shape, and the number of the small recessed portions can be arbitrarily set.

Rollers may be used as the rolling elements 30 of the bearing 2. Further, in the above-mentioned embodiments, while a bearing device for a wheel of third generation is illustrated, ones of first, second, and fourth generations may be used. Note that, when press-fitting the projecting portions 35, a member on which the projecting portions 35 are formed may be moved, with a member in which the recessed portions 36 are formed being stationary. Conversely, the member in which the recessed portions 36 are formed may be moved, with the member on which the projecting portions 35 are formed being stationary. Both of them may be moved. Note that, in the constant velocity universal joint 3, the inner race 6 and the shaft 10 may be integrated with each other through the recess-projection fitting structure M described in each of the embodiments.

In the above-mentioned embodiments, as the seal material interposed between the inner wall 22c and the bearing surface 60a of the bolt member 54 of the screw structure M2 for fixing the hub wheel 1 and the shaft section 12 to each other, a resin is applied on the bearing surface 60a side of the bolt member 54. In contrast, the resin may be applied on the inner wall 22c side. Alternatively, the resin may be applied on the bearing surface 60a side and the inner wall 22c side. Note that, at the time of screwing the bolt member 54, when the bearing surface 60a of the bolt member 54 and the bottom surface of the recessed portion 51 of the inner wall 22c are excellent in close contact property, the seal material as described above may be omitted. That is, by trimming the bottom surface of the recessed portion 51, it is possible to improve close contact property thereof with respect to the bearing surface 60a of the bolt member 54. As a matter of course, in the state of being finished by so-called lathe-turning without trimming the bottom surface of the recessed portion 51, the seal material may be omitted as long as close contact property can be exerted.

Regarding the guide recessed portions 44a, as illustrated in FIGS. 4A, 4B, and 4C, the gaps C1 and C2 are formed between the projecting portions 35 and the guide recessed portions 44a. The gaps may have any dimension as long as no decentering and no center inclination are caused during press-fitting and no increase in press-fitting load is caused by the projecting portions 35 coming in press-contact with the inner surfaces of the guide recessed portions 44a. Further, an axial length of the guide recessed portions 44a can be arbitrarily set, and long axial length is preferred in view of center alignment. However, upper limit of the axial length thereof is limited depending on an axial length of the hole portion 22 of the hub wheel 1. In contrast, when the axial length of the hole portion 22 of the hub wheel 1 is short, the guide recessed portions 44a do not function as guides, and there is a risk of causing decentering and center inclination. Therefore, it is necessary to determine the axial length of the guide recessed portions 44a in consideration of those factors.

Further, the guide recessed portions 44a may have any sectional shape as long as the projecting portions 35 can fit therein, and are not limited to ones illustrated in FIG. 4. The sectional shape thereof can be modified according to a sectional shape of the projecting portions 35, etc. The number of the guide recessed portions 44a does not need to be equal to the number of the projecting portions 35, and may be smaller or larger than the number of the projecting portions 35. In short, it is only necessary for some projecting portions 35 to fit in some guide recessed portions 44a so that the phase of the projecting portions 35 conforms to the phase of the recessed portions 36 formed by previous press-fitting.

The inclination angle $\theta$ of the inclined surfaces 77b of the end portions of the guide recessed portions 44a and the inclination angle $\theta 1$ of the bottoms of the guide recessed portions 44a can be arbitrarily changed. When the inclination angle $\theta$ of the inclined surfaces 77b is approximate to 90°, the inclined surfaces 77b are the same in function as the flat surfaces 77a orthogonal to the press-fitting direction. When the inclination angle $\theta$ is small, the guide recessed portions 44a become long and the axial length of the recess-projection fitting structure M is short. Further, when the inclination angle $\theta 1$ of the bottoms is large, it becomes difficult to form the guide recessed portions 44a. In contrast, when the inclination angle $\theta 1$ is small, the inclined surfaces 77b cannot exert a function in a case of inclining. Therefore, it is necessary to set the inclination angles $\theta$ and $\theta 1$ in consideration of those factors.

INDUSTRIAL APPLICABILITY

The present invention can be applied to bearing devices for a wheel of the first generation having the structure in which double-row roller bearings are independently used, the second generation in which a vehicle body attachment flange is integrally provided in an outer member, the third generation in which an inner raceway surface on one side of the double-row roller bearings is integrally formed with an outer circumference of a hub wheel integrally having a wheel attachment flange, and the fourth generation in which a constant velocity universal joint is integrated with the hub wheel and an inner raceway surface of the other side of the double-row roller bearings is integrally formed with an outer circumference of an outer joint member constituting the constant velocity universal joint.

REFERENCE SIGNS LIST 1 hub wheel
2 bearing
3 constant velocity universal joint
11 mouth section
12 shaft section
22 hole portion
22c inner wall
24 inner race
26, 27 outer raceway
28, 29 inner raceway
31 forged section
35 projecting portion
36 recessed portion
38 fitting contact region
44a guide recessed portion
45 extruded portion
50 threaded hole
52 end surface
57 housing section
58 gap
59 seal member
60a bearing surface
M recess-projection fitting structure
M1 shaft section press-fitting guide structure
M2 screw structure
W foreign-matter intrusion prevention means

The invention claimed is:

1. A bearing device for a wheel, comprising:
   a bearing comprising double-row rolling elements arranged between outer raceways and inner raceways opposed to each other;
   a hub wheel for attachment to a wheel;
   a constant velocity universal joint; and
   a recess-projection fitting structure through which the hub wheel and a shaft section of an outer joint member of the constant velocity universal joint are separably coupled with each other, the shaft section being inserted in a fitting manner into a hole portion of the hub wheel,
   wherein the recess-projection fitting structure comprises:
   projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and
   recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween,
   wherein the recess-projection fitting structure allows separation caused by application of a pulling-out force in the axial direction, and
   wherein the hole portion of the hub wheel is provided with an inner wall serving as a bearing surface of a bolt for fixing the constant velocity universal joint.

2. The bearing device for a wheel according to claim 1, wherein the hub wheel and the shaft section of the outer joint member are fixed to each other with a screw structure.

3. The bearing device for a wheel according to claim 2, wherein, during re-press-fitting after the separation, press-fitting with forward screwing of the screw structure is possible.

4. The bearing device for a wheel according to claim 1, wherein the outer joint member comprises:
   a mouth section in which an inner joint member is mounted; and
   the shaft section provided to protrude from a bottom portion of the mouth section, and
   wherein an end portion of the hub wheel is forged so as to apply precompression to the bearing externally fitted to the hub wheel.

5. The bearing device for a wheel according to claim 4, further comprising a gap formed between the mouth section of the outer joint member and a forged section formed by forging the end portion of the hub wheel.

6. The bearing device for a wheel according to claim 1, wherein the projecting portions of the recess-projection fitting structure are provided on the outer surface of the shaft section of the outer joint member, and
   wherein a hardness of at least press-fitting start end portions of the projecting portions is set to be higher than a hardness of a radially inner portion of the hole portion of the hub wheel.

7. The bearing device for a wheel according to claim 6, wherein an inner diameter dimension of the inner surface of the hole portion of the hub wheel is set to be smaller than a diameter dimension of a circle connecting vertexes of the projecting portions of the shaft section of the outer joint member, and to be larger than a diameter dimension of a circle connecting bottoms between the projecting portions.

8. The bearing device for a wheel according to claim 1, wherein the projecting portions of the recess-projection fitting structure are provided on the inner surface of the hole portion of the hub wheel, and wherein a hardness of at least press-fitting start end portions of the projecting portions is set to be higher than a hardness of a radially outer portion of the shaft section of the outer joint member of the constant velocity universal joint.

9. The bearing device for a wheel according to claim 8, wherein an outer diameter dimension of the shaft section of the outer joint member is set to be larger than a diameter dimension of a circular arc connecting vertexes of the projecting portions of the hole portion of the hub wheel, and to be smaller than a diameter dimension of a circle connecting bottoms between the projecting portions.

10. The bearing device for a wheel according to claim 1, further comprising a housing section for housing an extruded portion generated by formation of the recessed portions caused by the press-fitting.

11. The bearing device for a wheel according to claim 1, wherein, of the projecting portions, at least portions ranging from vertexes to middle portions in a projecting direction are press-fitted to the another of the outer surface of the shaft section of the outer joint member and the inner surface of the hole portion of the hub wheel, and
    wherein circumferential thicknesses of the middle portions in the projecting direction are set to be smaller than circumferential dimensions in positions corresponding to the middle portions in between the projecting portions adjacent to one another in a circumferential direction.

12. The bearing device for a wheel according to claim 1, wherein, of the projecting portions, at least portions ranging from vertexes to middle portions in a projecting direction are press-fitted to the another of the outer surface of the shaft section of the outer joint member and the inner surface of the hole portion of the hub wheel, and
    wherein a sum of circumferential thicknesses of the middle portions in the projecting direction is set to be smaller than a sum of circumferential thicknesses in positions corresponding to the middle portions in projecting portions on a fitting counterpart side in between the projecting portions adjacent to one another in a circumferential direction.

13. The bearing device for a wheel according to claim 1, wherein the recess-projection fitting structure is arranged at an immediate-underside avoiding position with respect to raceway surfaces of the bearing.

14. The bearing device for a wheel according to claim 1, wherein a hardness of at least press-fitting start end portions of the projecting portions is set to be higher than a hardness of a recessed-portion forming region into which the projecting portions are press-fitted, and a hardness difference therebetween is set to be equal to or larger than 20 points in HRC.

15. A bearing device for a wheel, comprising:
    a bearing comprising double-row rolling elements arranged between outer raceways and inner raceways opposed to each other;
    a hub wheel for attachment to a wheel;
    a constant velocity universal joint; and
    a recess-projection fitting structure through which the hub wheel and a shaft section of an outer joint member of the constant velocity universal joint are separably coupled with each other, the shaft section being inserted in a fitting manner into a hole portion of the hub wheel, wherein the recess-projection fitting structure comprises:

projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween, wherein the recess-projection fitting structure allows separation caused by application of a pulling-out force in the axial direction, and wherein a foreign-matter intrusion prevention means for preventing a foreign matter from intruding into the recess-projection fitting structure is provided.

16. The bearing device for a wheel according to claim 15, wherein the outer joint member comprises:

a mouth section in which an inner joint member is mounted; and the shaft section provided to protrude from a bottom portion of the mouth section, and wherein the foreign-matter intrusion prevention means is a seal member arranged between an end portion of the hub wheel and the bottom portion of the mouth section.

17. The bearing device for a wheel according to claim 15, wherein the hole portion of the hub wheel is provided with an inner wall with which an end surface on an outboard side of the shaft section of the outer joint member is brought into contact to regulate press-fitting, and wherein the foreign-matter intrusion prevention means is a seal material interposed between the inner wall and a bearing surface of a bolt member of a screw structure for fixing the hub wheel and the shaft section of the outer joint member to each other.

18. The bearing device for a wheel according to claim 15, wherein the hub wheel and the shaft section of the outer joint member are fixed to each other with a screw structure.

19. The bearing device for a wheel according to claim 15, wherein the outer joint member comprises:

a mouth section in which an inner joint member is mounted; and the shaft section provided to protrude from a bottom portion of the mouth section, and wherein an end portion of the hub wheel is forged so as to apply precompression to the bearing externally fitted to the hub wheel.

20. The bearing device for a wheel according to claim 15, wherein the projecting portions of the recess-projection fitting structure are provided on the outer surface of the shaft section of the outer joint member, and wherein a hardness of at least press-fitting start end portions of the projecting portions is set to be higher than a hardness of a radially inner portion of the hole portion of the hub wheel.

21. The bearing device for a wheel according to claim 15, wherein the projecting portions of the recess-projection fitting structure are provided on the inner surface of the hole portion of the hub wheel, and wherein a hardness of at least press-fitting start end portions of the projecting portions is set to be higher than a hardness of a radially outer portion of the shaft section of the outer joint member of the constant velocity universal joint.

22. The bearing device for a wheel according to claim 15, further comprising a housing section for housing an extruded portion generated by formation of the recessed portions caused by the press-fitting.

23. The bearing device for a wheel according to claim 15, wherein, of the projecting portions, at least portions ranging from vertexes to middle portions in a projecting direction are press-fitted to the another of the outer surface of the shaft section of the outer joint member and the inner surface of the hole portion of the hub wheel, and wherein circumferential thicknesses of the middle portions in the projecting direction are set to be smaller than circumferential dimensions in positions corresponding to the middle portions in between the projecting portions adjacent to one another in a circumferential direction.

24. The bearing device for a wheel according to claim 15, wherein, of the projecting portions, at least portions ranging from vertexes to middle portions in a projecting direction are press-fitted to the another of the outer surface of the shaft section of the outer joint member and the inner surface of the hole portion of the hub wheel, and wherein a sum of circumferential thicknesses of the middle portions in the projecting direction is set to be smaller than a sum of circumferential thicknesses in positions corresponding to the middle portions in projecting portions on a fitting counterpart side in between the projecting portions adjacent to one another in a circumferential direction.

25. The bearing device for a wheel according to claim 15, wherein the recess-projection fitting structure is arranged at an immediate-underside avoiding position with respect to raceway surfaces of the bearing.

26. The bearing device for a wheel according to claim 15, wherein a hardness of at least press-fitting start end portions of the projecting portions is set to be higher than a hardness of a recessed-portion forming region into which the projecting portions are press-fitted, and a hardness difference therebetween is set to be equal to or larger than 20 points in HRC.

27. A bearing device for a wheel, comprising:

a bearing comprising double-row rolling elements arranged between outer raceways and inner raceways opposed to each other;

a hub wheel for attachment to a wheel;

a constant velocity universal joint; and a recess-projection fitting structure through which the hub wheel and a shaft section of an outer joint member of the constant velocity universal joint are separably coupled with each other, the shaft section being inserted in a fitting manner into a hole portion of the hub wheel, wherein the recess-projection fitting structure comprises:

projecting portions extending in an axial direction provided on one of an outer surface of the shaft section of the outer joint member and an inner surface of the hole portion of the hub wheel, the projecting portions being press-fitted along the axial direction into another of the outer surface of the shaft section of the outer joint member and the inner surface of the hole portion of the hub wheel; and recessed portions formed through press-fitting of the projecting portions in the another of the outer surface of the shaft section of the outer joint member and the inner surface of the hole portion of the hub wheel so as to be held in close contact with the projecting portions in a fitting manner, the projecting portions and the recessed portions being held in close contact with each other through an entire region of fitting contact regions therebetween, wherein the recess-projection fitting structure allows separation caused by application of a pulling-out force in the axial direction, and wherein a shaft section press-fitting guide structure is provided on a side from which the press-fitting of the projecting portions is started.

28. The bearing device for a wheel according to claim 27, wherein the shaft section press-fitting guide structure comprises guide recessed portions fitting to the projecting portions, and conforms a phase of the projecting portions as one side to a phase of the recessed portions as another side.

29. The bearing device for a wheel according to claim 28, wherein, in the shaft section press-fitting guide structure, in a state in which the projecting portions fit in the guide recessed portions, radial gaps are formed between vertexes of the projecting portions and bottoms of the guide recessed portions.

30. The bearing device for a wheel according to claim 28, wherein, in the shaft section press-fitting guide structure, in a state in which the projecting portions fit in the guide recessed portions, circumferential gaps are formed between side portions of the projecting portions and side portions of the guide recessed portions.

31. The bearing device for a wheel according to claim 28, wherein, in the shaft section press-fitting guide structure, in a state in which the projecting portions fit in the guide recessed portions, radial gaps are formed between vertexes of the projecting portions and bottoms of the guide recessed portions, and circumferential gaps are formed between side portions of the projecting portions and side portions of the guide recessed portions.

32. The bearing device for a wheel according to claim 28, wherein, in the shaft section press-fitting guide structure, end portions of the guide recessed portions on a side of the recess-projection fitting structure are formed into flat surfaces which are orthogonal to a press-fitting direction.

33. The bearing device for a wheel according to claim 28, wherein, in the shaft section press-fitting guide structure, end portions of the guide recessed portions on a side of the recess-projection fitting structure are formed into inclined surfaces which are inclined and reduced in diameter along a press-fitting direction.

34. The bearing device for a wheel according to claim 27, wherein, in the shaft section press-fitting guide structure, a radial depth of guide recessed portions is reduced in diameter along a press-fitting direction.

35. The bearing device for a wheel according to claim 27, wherein the hub wheel and the shaft section of the outer joint member are fixed to each other with a screw structure.

36. The bearing device for a wheel according to claim 27, wherein the outer joint member comprises:
a mouth section in which an inner joint member is mounted; and
the shaft section provided to protrude from a bottom portion of the mouth section, and wherein an end portion of the hub wheel is forged so as to apply precompression to the bearing externally fitted to the hub wheel.

37. The bearing device for a wheel according to claim 27, wherein the projecting portions of the recess-projection fitting structure are provided on the outer surface of the shaft section of the outer joint member, and wherein a hardness of at least press-fitting start end portions of the projecting portions is set to be higher than a hardness of a radially inner portion of the hole portion of the hub wheel.

38. The bearing device for a wheel according to claim 27, wherein the projecting portions of the recess-projection fitting structure are provided on the inner surface of the hole portion of the hub wheel, and wherein a hardness of at least press-fitting start end portions of the projecting portions is set to be higher than a hardness of a radially outer portion of the shaft section of the outer joint member of the constant velocity universal joint.

39. The bearing device for a wheel according to claim 27, further comprising a housing section for housing an extruded portion generated by formation of the recessed portions caused by the press-fitting.

40. The bearing device for a wheel according to claim 27, wherein, of the projecting portions, at least portions ranging from vertexes to middle portions in a projecting direction are press-fitted to the another of the outer surface of the shaft section of the outer joint member and the inner surface of the hole portion of the hub wheel, and wherein circumferential thicknesses of the middle portions in the projecting direction are set to be smaller than circumferential dimensions in positions corresponding to the middle portions in between the projecting portions adjacent to one another in a circumferential direction.

41. The bearing device for a wheel according to claim 27, wherein, of the projecting portions, at least portions ranging from vertexes to middle portions in a projecting direction are press-fitted to the another of the outer surface of the shaft section of the outer joint member and the inner surface of the hole portion of the hub wheel, and wherein a sum of circumferential thicknesses of the middle portions in the projecting direction is set to be smaller than a sum of circumferential thicknesses in positions corresponding to the middle portions in projecting portions on a fitting counterpart side in between the projecting portions adjacent to one another in a circumferential direction.

42. The bearing device for a wheel according to claim 27, wherein the recess-projection fitting structure is arranged at an immediate-underside avoiding position with respect to raceway surfaces of the bearing.

43. The bearing device for a wheel according to claim 27, wherein a hardness of at least press-fitting start end portions of the projecting portions is set to be higher than a hardness of a recessed-portion forming region into which the projecting portions are press-fitted, and a hardness difference therebetween is set to be equal to or larger than 20 points in HRC.

* * * * *